(12) United States Patent
Kazmer

(10) Patent No.: US 12,358,208 B2
(45) Date of Patent: Jul. 15, 2025

(54) INJECTION PRINTING VIA SHELL DEPOSITION AND CAVITY FILLING

(71) Applicant: University of Massachusetts, Boston, MA (US)

(72) Inventor: David O. Kazmer, Georgetown, MA (US)

(73) Assignee: University of Massachusetts, Boston, MA (US)

( * ) Notice: Subject to any disclaimer, the term of this patent is extended or adjusted under 35 U.S.C. 154(b) by 314 days.

(21) Appl. No.: 17/619,069

(22) PCT Filed: Jun. 16, 2020

(86) PCT No.: PCT/US2020/037904
§ 371 (c)(1),
(2) Date: Dec. 14, 2021

(87) PCT Pub. No.: WO2020/257178
PCT Pub. Date: Dec. 24, 2020

(65) Prior Publication Data
US 2022/0219383 A1 Jul. 14, 2022

Related U.S. Application Data

(60) Provisional application No. 62/864,118, filed on Jun. 20, 2019, provisional application No. 62/864,105, filed on Jun. 20, 2019.

(51) Int. Cl.
*B29C 64/118* (2017.01)
*B29C 64/386* (2017.01)
(Continued)

(52) U.S. Cl.
CPC .......... *B29C 64/118* (2017.08); *B29C 64/386* (2017.08); *B33Y 10/00* (2014.12); *B33Y 50/00* (2014.12); *B33Y 80/00* (2014.12)

(58) Field of Classification Search
CPC ..... B29C 64/118; B29C 64/386; B33Y 10/00; B33Y 80/00
(Continued)

(56) References Cited

U.S. PATENT DOCUMENTS 9,475,233 B2   10/2016  Schmel
9,884,450 B2    2/2018  Schmel
(Continued)

FOREIGN PATENT DOCUMENTS

WO   2018072034 A1   4/2018

OTHER PUBLICATIONS

Belter, et. al., "Strengthening of 3D Printed Fused Deposition Manufactured Parts Using the Fill Compositing Technique", Plos One | DOI: 10.1371/journal.pone.0122915, Apr. 16, 2015, pp. 1-19.
(Continued)

*Primary Examiner* — Christina A Johnson
*Assistant Examiner* — Xue H Liu
(74) *Attorney, Agent, or Firm* — Armis IP Law, LLC

(57) ABSTRACT

A printed component, printing process, and apparatus providing (i) a printed shell defines an internal cavity having a height greater than the height of one layer of the provided shell and a width greater than one road of a printed shell, (ii) the internal cavity at least partially filled with injected material, and (iii) the material composing the internal cavity defining one or more interlocks with the material composing the printed shell. Various embodiments are described comprising the use of multiple materials, diverging and converging walls, continuous and intermittent injections of the filled cavities, inserted components, and various monitoring and control methods. Via techniques as described herein, the printing time of an object fabricated via additive printing is while also increasing the strength and quality of the printed components.

37 Claims, 15 Drawing Sheets

(51) Int. Cl.
*B33Y 10/00* (2015.01)
*B33Y 50/00* (2015.01)
*B33Y 80/00* (2015.01)

(58) Field of Classification Search
USPC ........................................................ 264/308
See application file for complete search history.

(56) References Cited

U.S. PATENT DOCUMENTS

2018/0036972 A1  2/2018  Talgorm et al.
2018/0126635 A1  5/2018  Schmel
2018/0311891 A1  11/2018  Duty et al.

OTHER PUBLICATIONS

International Search Report, PCT/US2020/037904, Aug. 28, 2021, pp. 1-2.
Duty, et al., "Z-Pinning approach for 3D printing mechanically isotropic materials", Additive Manufacturing 27( 2019), Dec. 19, 2018, pp. 175-184.
Chesser, et al. "Extrusion control for high quality printing on Big Area Additive Manufacturing (BAAM) systems" Additive Manufacturing 28 (2019), Sep. 14, 2018, pp. 445-455.

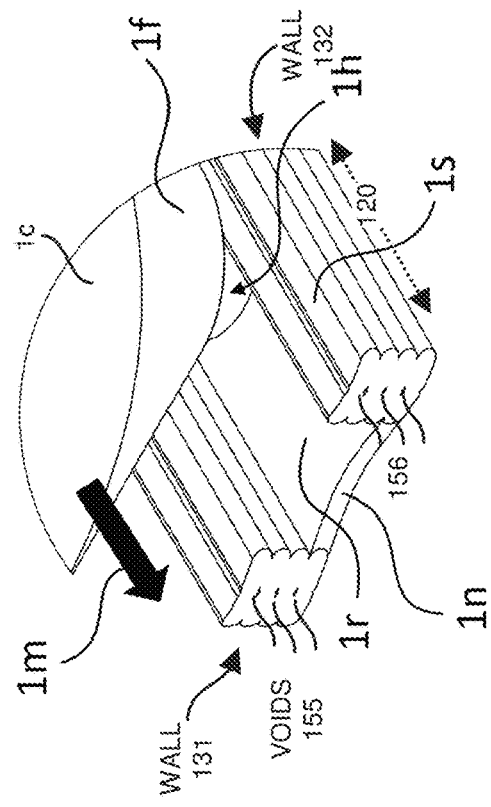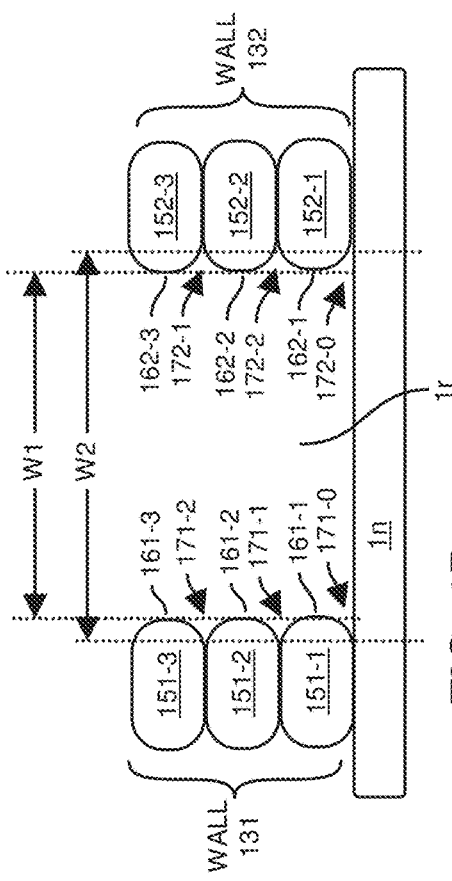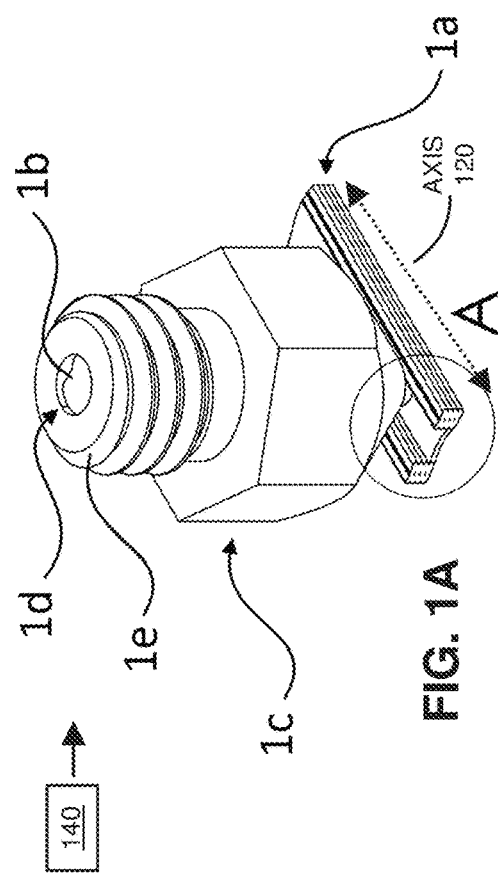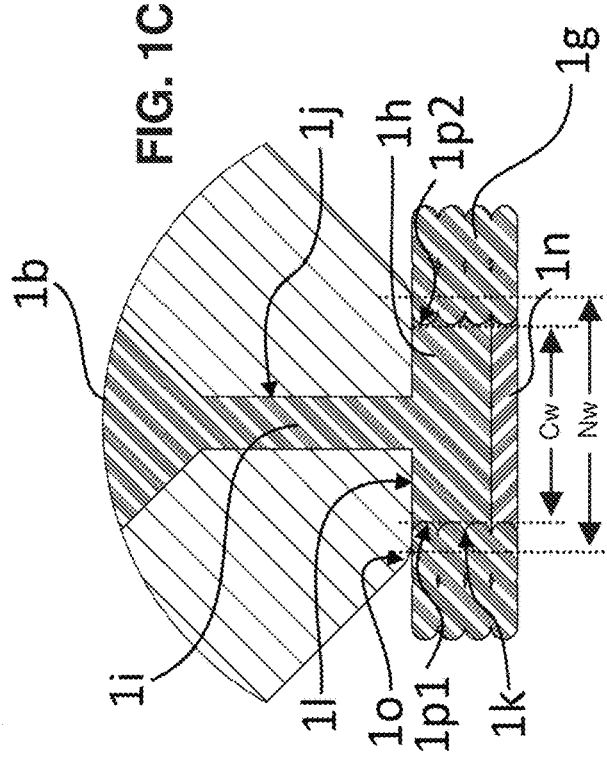

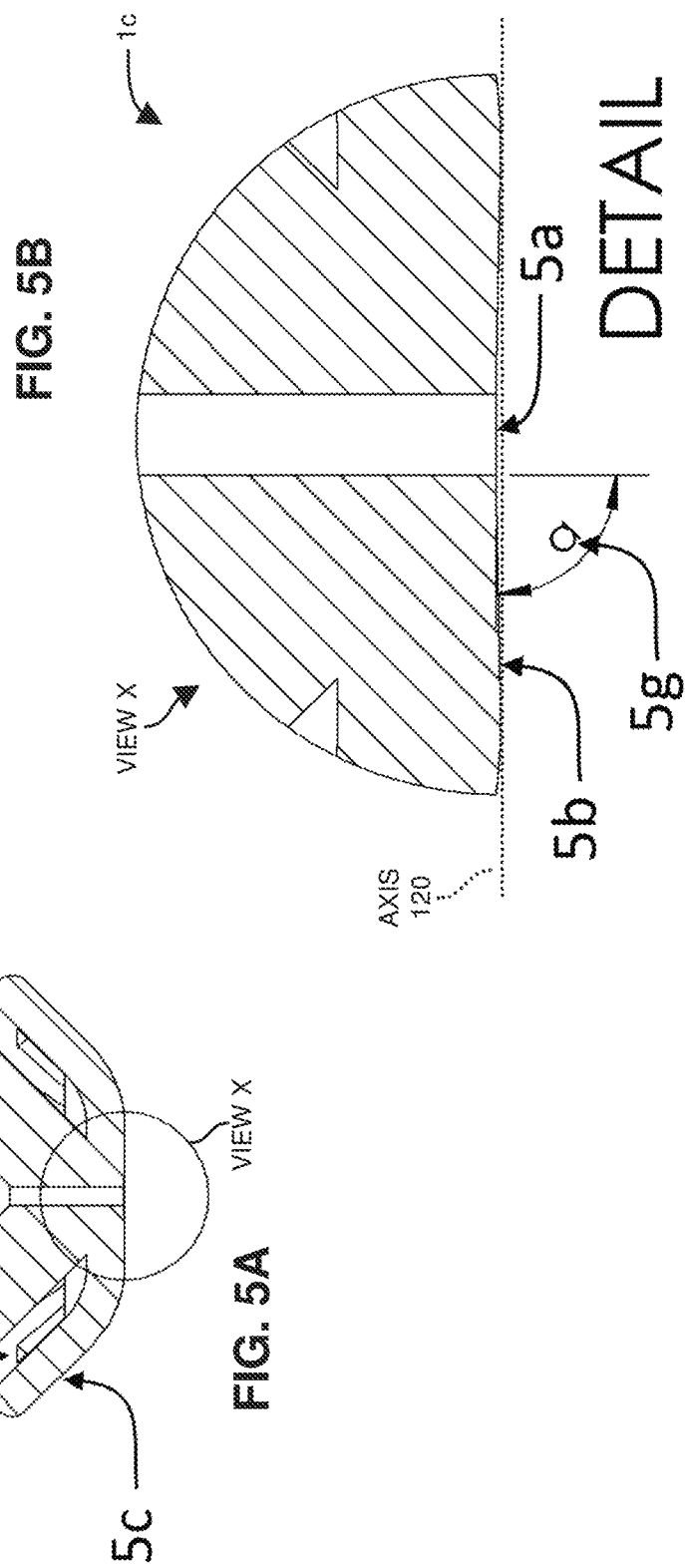

INJECTION PRINTING VIA SHELL DEPOSITION AND CAVITY FILLING

RELATED APPLICATIONS

This application is a national stage filing of PCT application No.: PCT/US2020/037904 filed Jun. 16, 2020 entitled INJECTION PRINTING VIA SHELL DEPOSITION AND CAVITY FILLING, which itself claims priority to U.S. Provisional Patent Application No. 62/864,105 filed Jun. 20, 2019 entitled INJECTION PRINTING (EXTRUSION DEPOSITION AND INJECTION), U.S. Provisional Patent Application No. 62/864,118 filed Jun. 20, 2019 entitled INJECTION FUSED FILAMENT FABRICATION, the entire teachings of all of which are incorporated herein by reference.

BACKGROUND

Material extrusion, also referred to as fused filament fabrication (FFF) and fused deposition modeling (FDM), is an additive manufacturing technique that deposits roads of molten polymer that solidify into a desired shape. Material extrusion enables the creation of complex designs without tooling that are difficult to produce or otherwise unattainable via traditional manufacturing. Despite the benefits and widespread use of material extrusion, dominating constraints in application of material extrusion may include limited part strength, high degree of anisotropy, poor print resolution, inadequate surface finish, lack of repeatability, uncontrolled shrinkage and warpage, limited process observability and quality assurance, low production rates, very poor energy efficiency, and others.

BRIEF DESCRIPTION OF EMBODIMENTS

Embodiments herein include methods for faster printing of higher strength objects by filling one or more cavities defined by a printed shell using the nozzle of a 3D printer. For example, in one embodiment, multiple roads (such as depositions of material, layers of material, material paths, etc.) are deposited by material extrusion to construct a shell having detailed features and surfaces as well as multiple interior cavities. The interior cavities are filled, via a printer head, as a bulk process akin to injection molding at much higher volumetric flow rates. Depending on the part geometry, interior shell walls are used to decompose the width into multiple cavities that are individually filled.

In accordance with further example embodiments, to improve part properties such as impact strength, the depth and shape of the cavities are controlled by the pre-processing and production of the geometry so that the cavity crosses a varying number of shell layers. Several methods and options are disclosed. For example, the cavities may be offset in the vertical direction to form a checkboard pattern. If desired, the roads forming the shell layers can also be printed with varying widths as shown in the left outer shell. The varying road width allow the formation of undercuts inside the cavity while increasing surface area for bonding with the injected material. Inserts such as mechanical fasteners and electrical components, among others, may be inserted into the printed shell to construct cavities to be filled.

The designs described herein pertain to a type of fused filament fabrication (FFF process), also referred to as fused deposition modeling (FDM) and extrusion deposition (ED) and by other terms. Generally, these technologies decompose a part's three-dimensional (3D) geometry into a series of printed roads that are consecutively printed to reproduce the part's 3D geometry. Herein, the word "part" means the product being produced by the 3D printing process by additive manufacturing. The part or product may be a device or article for sale, a component that is assembled or finished, or more generally a form of matter having a defined geometry.

In a first embodiment, generally referred to as injection printing, the nozzle traverses along the top of the shell structure, filling the internal cavity while also providing interlocks between the injected material and shell structure while printing. A fourth embodiment discloses how the shell structure may be configured to have multiple walls including undercuts and internal passageways with discrete injection and vent locations. The nozzle can then index to the various injection locations and deliver the injected material. The injected material will occupy the internal cavity creating interlocks with the undercuts and internal passageways while the displaced air exits though the vent locations. The printing process can then continue by indexing the nozzle to additional injection locations or otherwise printing additional shell structures, and so on.

Several different examples for injection printing are described. A second embodiment describes printing and injecting with offset adjoining cavities to maximize print speed and quality such as for an impact specimen. Some of the underlying theory as to stress and deflection of the shell walls are also disclosed. A fourth embodiment describes printing and injecting with varying road and cavity widths along a length of the part to efficiently produce non-uniform shapes such as for a tensile specimen.

A fifth embodiment demonstrates a nozzle with a wider distal surface to provide injection into wider cavities. A sixth embodiment demonstrates the iteratively printing and injecting with roads of varying width to provide an interlocking structure with greater interfacial contact area between the shell walls and internal filled material. A seventh embodiment demonstrates the use of partially filled cavities to form a web or bridge between the injected material and an opposing substrate. The eighth embodiment discloses the provision of multiple cavities having an offset, diamond shape to provide parts with increased strength.

A ninth embodiment describes the use of a calibration technique to characterize the maximum flow rate that can be achieved from a heated nozzle, material, and processing condition. Some of the underlying theory as to flow and heat transfer are also disclosed supporting a second embodiment with a revised nozzle design supporting increased heat transfer and volumetric flow rates. While the validation described herein applies to a feedstock in the form of a filament that is heated to provide an extrudable material that cools to become solid, the conceived invention is applicable to other feedstocks of varying materials and forms.

The tenth embodiment discloses the optional use of melt pressure monitoring with a pressure transducer located near the nozzle orifice or a torque transducer on the drive wheel of the filament. The supply pressure can be used to control the melt viscosity and volumetric flow rate of the printed shell or injected material. The melt pressure can also be used as a feedback signal to control the delivered melt flow rate to ensure sufficient melt pressure to compensate to volumetric shrinkage as the injected material cools, akin to the packing and holding stages of injection molding. The nozzle for injection can also be positioned slightly above the shell structure. To provide compensation for the volumetric shrinkage, the distal surface of the nozzle can provide compression by narrowing the distance between the nozzle and the printed part, akin to injection compression molding.

The eleventh embodiment describes the methodology for providing the shell, injecting into the cavity, and monitoring the process.

Embodiments herein include a method comprising: dispensing first material onto a substrate, the dispensed first material producing a first wall and a second wall that define a cavity, each of the first wall and the second wall produced from multiple layers of the first dispensed material; contacting a distal surface of a nozzle to respective surfaces of the first wall and the second wall, the contacting forming a seal between the distal surface of the nozzle and the respective surfaces of the first wall the second wall; and while the contacting of the distal surface of the nozzle forms a seal with the respective surfaces of the first wall the second wall, injecting second material through the nozzle into the cavity between the first wall and the second wall.

In accordance with further embodiments, the first material is the same as the second material. Alternatively, the second material is different than the first material.

In still further example embodiments, the second material injected into the cavity becomes interlocked with the first wall and the second wall based on variations in a width of the cavity between the first wall and the second wall.

Still further embodiments herein include a nozzle in which a diameter of a distal surface of the nozzle is greater than a width of the cavity between the first wall and the second wall.

In yet further example embodiments, a width of the cavity between the first wall and the second wall varies.

In one embodiment, the first wall and second wall define multiple cavities. If desired, the nozzle is indexed to inject material to two or more of the multiple cavities. In still further example embodiments, the multiple cavities are offset in multiple directions.

The cavity between the first wall the second wall can be filled with material based upon movement of the nozzle along a length wise axis of the cavity. For example, in one embodiment, injecting the second material through the bore of the nozzle into the cavity between the first wall and the second wall includes: i) moving the nozzle with respect to a lengthwise axis of the cavity; and ii) dispensing the second material into the cavity as the nozzle is moved along the lengthwise axis. As previously discussed, the nozzle can be configured to inject material through the nozzle into the cavity between the first wall and the second wall while the nozzle the distal surface of the nozzle forms a seal with the respective surfaces of the first wall the second wall during the movement or while the nozzle is stationary.

Further embodiments herein include an apparatus (object, device, component, assembly, etc.) comprising first material and second material. For example, first material is dispensed onto a (host) substrate. The dispensed first material produces a first wall and a second wall that define a cavity; each of the first wall and the second wall produced from multiple layers of the first dispensed material. The second material is injected into the cavity between the first wall and the second wall. The second material injected into the cavity is interlocked with the first wall and the second wall based on variations in a width of the cavity between the first wall and the second wall.

In one embodiment, the first material is the same type of material as the as the second material. Alternatively, the second material is different than the first material.

In still further example embodiments, the first wall and second wall define multiple cavities. The multiple cavities are injected with material from one or more nozzles (such as printer heads). If desired, the multiple cavities are offset in multiple directions.

In yet further example embodiments, the second material is injected through a bore of a nozzle into the cavity between the first wall and the second wall via: i) movement of the nozzle with respect to a lengthwise axis of the cavity; and ii) dispensing of the second material into the cavity as the nozzle is moved along the lengthwise axis.

In one embodiment, the first wall is a single layer of material dispensed on the substrate; the second wall is a single layer of material dispensed on the substrate.

Additionally, or alternatively, the first wall is fabricated from multiple layers of material dispensed on the substrate; the second wall is fabricated from multiple layers of material dispensed on the substrate.

In accordance with still further example embodiments, a width of the cavity is greater than each of a width of the first wall and the width of the second wall.

Further embodiments herein include a method for planning a 3D printing process, the method comprising: analyzing the geometry of the part to be produced; based on the analyzing, decomposing the geometry into at least one shell and at least one cavity; and defining control operations to print the at least one shell and inject material into the at least one cavity.

In one embodiment, the method further comprises performing flow analysis of printing the at least one shell.

Further embodiments herein include performing a stress analysis of at least a portion of a shell during injection of the material into the at least one cavity.

Yet further embodiments herein include performing one or more of the following: i) a deflection analysis of at least a portion of the shell with respect to injection of the material into the at least one cavity, ii) a thermal analysis of at least a portion of the at least one shell during or after the injection of the material into an adjacent cavity, iii) a production time analysis of the forming of at least a portion of the shell, iv) an efficiency analysis of the production time relative to a target flow rate.

As previously discussed, in one embodiment, a width of the cavity varies.

Further embodiments herein include an apparatus (fabrication system) comprising: a material dispensing system operative to dispense feedstock through a nozzle; a build plate operative to additively manufacture a part geometry; a positioning system operative to control a relative position of the nozzle and the build plate; and a controller operative to: i) dispense material as a function of the relative position of the nozzle and the build plate; ii) dispense material to deposit extruded material on the build plate to print a shell that defines a cavity; iii) position a distal surface of the nozzle to a surface of the printed shell; and iv) inject material from the material dispensing system into the cavity.

In accordance with further example embodiments, the diameter of the distal surface of the nozzle is greater than the width of the cavity between walls.

In still further example embodiments, an orifice diameter of the nozzle is between 0.1 and 2 mm.

In one embodiment, the material dispensing is controlled in response to (based on) a melt pressure feedback associated with the nozzle.

As previously discussed, in one embodiment, one or more walls of the printed shell defines multiple cavities. The multiple cavities are offset in two or more directions.

In accordance with further embodiments, multiple layers of the extruded material from the one or more print head nozzles define the shell, a cross-sectional area of the cavity varying.

In still further example embodiments, the cavity is only partially filled with injected material.

In contrast to conventional techniques, embodiments herein improve the overall part strength and stiffness by up to 45% and 25%, respectively. This is achieved in one or more significant ways. For example, the filling of the second resin is performed after the 3D printed shell as described herein is made and removed from the 3D printer.

In one embodiment, the processes embodied in the injection printing as described herein intertwines the printing of the shell and filling of the cavity within a continuing process. Additionally, the injection printing method uses a nozzle of 3D printer as an injection unit for filling the provided cavities. Furthermore, the described injection printing as described herein provides numerous novel features related to the enablement and optimal performance including the use of: (i) stationary and moving nozzles for cavity filling, (ii) larger distal nozzle surfaces to inject material into wider cavities, (iii) vertically displacement of larger distal nozzle surfaces to compression mold or "pack" additional injected material as the previous solidified material cools and shrinks, (iv) gates, undercuts, and vents to perform numerous functions, (v) placement of inserts into cavities for retention by cavity filling, (vi) checkered or offset cavities to produce stronger parts, (vii) nozzles with flared distal surfaces to provide sealing and cooling benefits, (viii) varying road and cavity widths to increase print speed and printed part strength, (ix) partial filling of cavities to reduce printing time, reduce part weight, retain dissimilar materials, or allow relative motion within the printed materials, and (x) numerous other theoretical and practical insights for practicing embodiments herein.

Additionally, in contrast to conventional techniques, injection printing as described herein forms relatively large and deep cavities that are filled at much higher volumetric flow rates. In this manner, in one embodiment, injection printing is a hybrid process of injection molding and material extrusion in which the additively manufactured part is made using its printed shell as its own injection mold. As a result, injection printing enables significant improvements in both deposition rates and material isotropy.

Moreover, in contrast to conventional techniques, embodiments herein include printing a shell to provide an internal cavity comprised of opposing walls. By subsequently filling the internal cavity, the extruder (print head, nozzle, etc.) forces the injected material at higher pressure into the nooks and crannies that exist between deposited roads (deposition material defining respective walls of the cavity) to produce parts (objects, devices, apparatus, etc.) that are more fully dense, stronger, and with more isotropic properties.

In yet further example embodiments, in contrast to conventional techniques, injection printing as described herein provides a cavity defined by shell walls and the nozzle surface providing an orifice through which material is injected. Due to the sealed cavity, the injected material can be forced at higher pressure into the nooks and crannies that exist between deposited roads to parts that are more fully dense, stronger, and with more isotropic properties.

These and further embodiment are discussed below in more detail.

Note that any of the resources as discussed herein can include one or more computerized devices, mobile communication devices, servers, base stations, wireless communication equipment, fabrication systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium (or media) and/or system having instructions stored thereon to facilitate wireless communications in a network environment. The instructions, when executed by computer processor hardware, cause the computer processor hardware (such as one or more co-located or disparately processor devices) to: dispensing first material onto a substrate, the dispensed first material producing a first wall and a second wall that define a cavity, each of the first wall and the second wall produced from multiple layers of the first dispensed material; contact a distal surface of a nozzle to respective surfaces of the first wall and the second wall, the contacting forming a seal between the distal surface of the nozzle and the respective surfaces of the first wall the second wall; and inject second material through the nozzle into the cavity between the first wall and the second wall.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of additive printing fabrication. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIGS. 1A, 1B, 1C, and 1D are example diagrams illustrating injection printing with a flat nozzle according to embodiments herein.

FIGS. 5A and 5B are example diagrams illustrating an enlarged nozzle with an angled distal surface according to embodiments herein.

Figure 2:
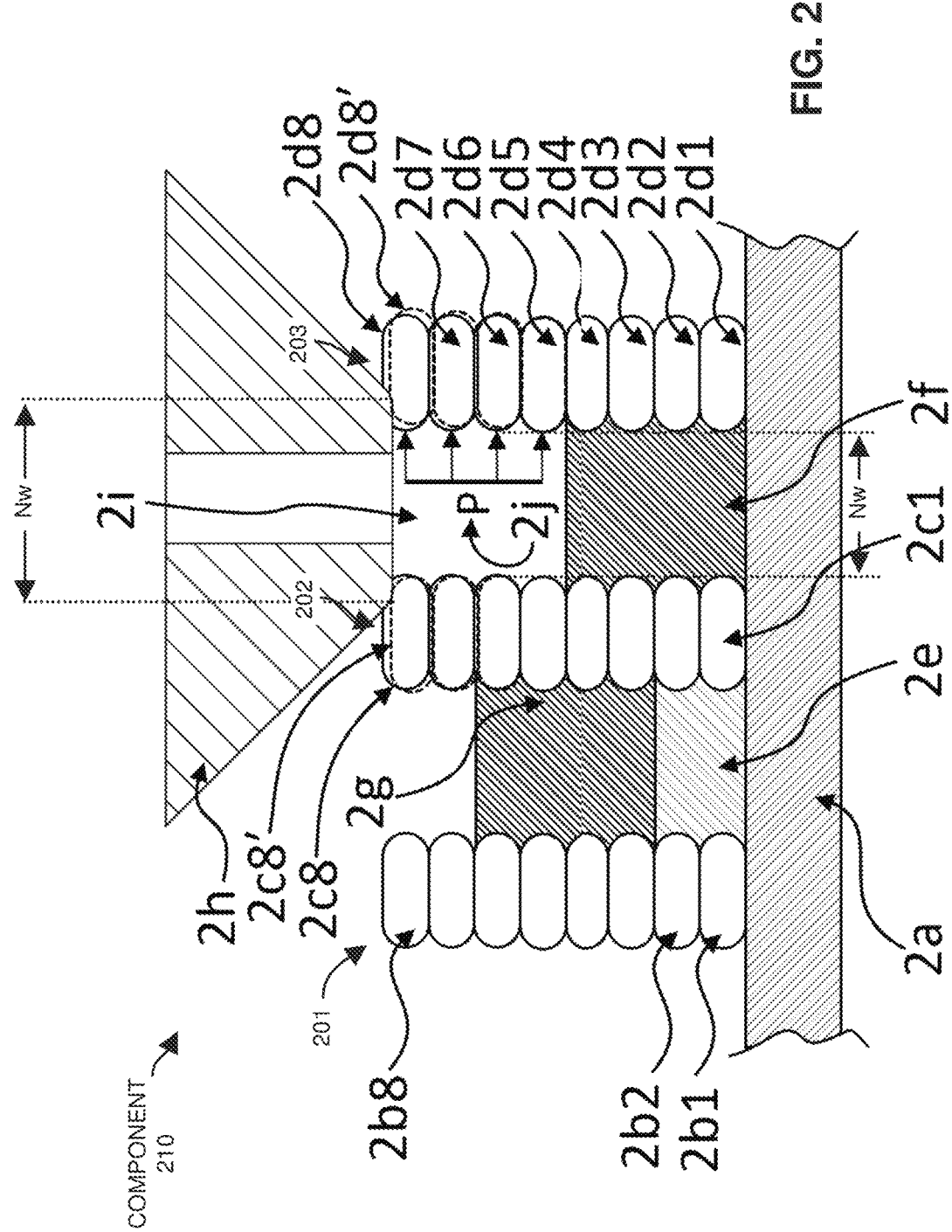
FIG. 2 is an example diagram illustrating printing and injecting with offset adjoining cavities such as for an impact specimen as well as the structural loading of an adjoining shell wall during injection of material into a cavity according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Injection printing as described herein brings at least the two significant advantages over conventional 3D printing methods. First, the filling of the internal cavities within the shell significantly reduces the time required to produce the printed parts. The reason is that the feedstock material can quickly be delivered into the large internal cavities with less traversing of the nozzle as required for printing multiple roads for conventional infilling. Second, the filling of the internal cavities as described herein provides for improved formation of so-called interlocks that increases the strength of the printed parts. The strength of these interlocks is further improved given the relatively large volume of the filled cavities, such that the thermal mass of the filled cavities provides for higher temperatures at the cavity/shell interface and thus improved weld strengths.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. As described in the later embodiments, the injection printing invention can also provide additional benefits associated with its optional features. For example, the determination and control of the injection pressure can improve the weld strength and reduction of internal voids associated with volumetric shrinkage, thereby improving the strength of the printed part. Furthermore, the injection into cavities that are offset in the vertical direction or have interlocking converging and diverging surface can provide for improved part strength akin to injection molding.

Some portions of the detailed description have been presented in terms of algorithms or schematic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating,"

"determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

FIGS. 1A, 1B, and 1C, illustrate injection printing with a nozzle having an orifice disposed on a distal surface (such as flat face, convex surface, concave surface, planar surface, etc.) and having a respective surface width, Nw, that is wider than the width (labeled Cw) of the cavity 1r defined by the inner surfaces 1p1 and 1p2 (such as wall surfaces) of the printer shell 1g. A portion of a printed part 1a is produced by one or more feedstock materials 1b delivered by one or more nozzles 1c (such as print head, part of a print head assembly, etc.) via an internal bore 1d connected by engagement means 1e such as threads to a main printer assembly.

In one embodiment, the distal surface of the nozzle 1c comprises a converging surface 1f leading to a nozzle tip with an internal bore 1j. Fabricator 140 controls operation of nozzle 1c and creation of respective part 1a (component, assembly, etc.).

During operation of filling the respective cavity 1r with material 1b (or multiple different materials, mixed or extruded at different times) extruded from the nozzle 1c under control of the fabricator 140, in one embodiment, the distal nozzle surface 1l moves along (traverses) axis 120 while the nozzle surface 1l is in continuous contact with the top layer is of the printed shell 1g. As shown in FIG. 1, the distal nozzle surface 1l is designed to span the width of the upper surface of the internal cavity 1r defined by the opposing walls (stack or successive layers of deposited material such as producing a first wall 131 and a second wall 132, or any number of walls) of the printed shell 1g. A convex chamfer or fillet 1o present at the intersection of the distal nozzle surface 1l and the converging nozzle surface 1o reduces potential interference between the distal nozzle surface 1l and the top surface 1s of the respective walls 131 and 132 of the printed shell 1g.

Note that, while distal nozzle surface 1l is depicted as co-planar with the top surface of the shell 3g, a small vertical clearance, preferably around 1% but on the order of 0.1 to 10% of the road height (height of walls 131 and 132), can be provided to minimize interference between the nozzle and printed shell while ensuring an adequate seal during injection of the material 1B into the cavity 1r.

In operation, multiple layers of the printed shell 1g are first printed on a respective (host) substrate 1n. After fabrication of the respective walls 131 and 132 such as via successive depositions of first material (or multiple different types of materials), the injected material 1h is delivered through the nozzle tip bore 1j to fill the internal cavity 1r defined by the previously printed shell 1g and substrate 1n.

Note that substrate 1n can be any suitable object/component such as i) a build plate of a respective printer, ii) previously deposited material provided by printing or injection, iii) or some other provided component.

In one embodiment, given the geometry of the internal cavity 1r and distal nozzle surface 1l, embodiments herein include applying a significant or appropriate internal pressure to the material 1b into the bore 1d and cavity 1r to ensure complete filling of the internal cavity 1r to form one or more so-called interlocks 1k, which are formed via varying widths of the walls defining the cavity 1r.

More specifically, as shown in FIG. 1, the width of the printed shell walls can be composed of more than one road (deposited one or more layers of material from the nozzle) in order to ensure sufficient shear strength for withstanding the delivered pressure of the injected material. In comparison to conventional 3D printing, where the internal layers are individually printed, embodiments herein of injecting material into the respective cavity 1r provide faster printing of higher strength parts because the large internal volume can be more quickly filled than individually depositing multiple roads layers, one on top of the other.

In other words, embodiments herein include creating wall 131 over a first region of the substrate 1n via a first pass of a respective nozzle depositing first material to the respective substrate 1n over the first region. After the first pass of a respective nozzle over the first region and depositing of material, embodiments herein include creating a yet higher cavity wall via a second pass of depositing the first material on top of the first deposited material. After the second pass, embodiments herein include creating a yet higher cavity wall via a third pass of depositing the first material on top of the second deposited material. In such an instance, the height of the wall 131 over the first region can be controlled via one or more passes depositing strips of material, one on top of the other.

Embodiments herein include creating wall 132 over a second region of the substrate 1n via a first pass of a respective nozzle depositing first material to the respective substrate 1n over the second region. After the first pass of a respective nozzle over the second region, embodiments herein include creating a yet higher wall via a second pass of depositing the first material on top of the first deposited material. After the second pass, embodiments herein include creating a yet higher wall via a third pass of depositing the first material on top of the second deposited material. In such an instance, the height of the wall 132 over the second region can be controlled via one or more passes depositing strips of material, one on top of the other.

In accordance with further embodiments as discussed below, the creation of the different layers of walls can include: i) initial first pass deposition of a first layer of material from the nozzle 1c at different locations on the substrate to create a first portion of the walls 131 and 132, ii) a second pass deposition of a second layer of material at the different locations on the substrate to create a second portion of the walls 131 and 132, and so on.

Note that the material used to create wall 131 and 132 can be the same as the material that is used to fill the cavity 1r. Alternatively, the material used to fabricate the walls 131 and 132 (layers of deposited material) is different than the material that is dispensed from the nozzle 1C to fill the respective cavity 1r. Embodiments herein further include implementation of a first nozzle to create the respective walls 131 and 132 and implementation of a second nozzle to fill the respective cavity 1r.

In general, each pass of the nozzle can be of the same or different material. In such an instance, even the walls 131 and 132 may be fabricated from one or more materials; the cavity 1r can be fabricated from be fabricated from one or more materials, and so on.

FIG. 1D is an example diagram illustrating a cross-section view (view along axis 120) of a fabricated device according to embodiments herein.

In a manner as previously discussed, to fabricate the cavity wall 131, the nozzle 1c makes a first pass (such as along axis 120) over a first region of substrate 1n) to deposit a first path (layer) of material 151-1 over a first region of the substrate 1n. The nozzle 1c also makes a first pass (such as along axis 120) over a second region of substrate 1n) to deposit a second path (layer) of material 152-1 over the second region of the substrate 1n.

To further fabricate the cavity wall 131, the nozzle 1c makes a second pass (such as along axis 120) over the path (layer) of material 151-1 to deposit a second path (layer) of material 151-2 over the first path of material 151-1; the nozzle 1c makes a second pass (such as along axis 120) over the path (layer) of material 152-1 to deposit a second path (layer) of material 152-2 over the path of material 152-1.

To further fabricate the cavity wall 131, the nozzle 1c makes a third pass (such as along axis 120) over the path (layer) of material 151-2 to deposit a third path (layer) of material 151-3 over the second path of material 151-2; the nozzle 1c makes a second pass (such as along axis 120) over the path (layer) of material 152-2 to deposit a third path (layer) of material 152-3 over the path of material 152-2.

As further shown in the cross-sectional view of FIG. 1D, each of the respective paths (depositions) of material 151 (151-1, 151-2, 151-3, etc.) includes a bulge 161 (such as protrusion, rounded edge, bump out, etc.) extending (protruding) into the cavity 1r. For example, the deposition of material 151-1 produces bulge 161-1 into the cavity 1r; the deposition of material 151-2 produces bulge 161-2 into the cavity 1r; the deposition of material 151-3 produces bulge 161-3 into the cavity; and so on.

As further shown in the cross-sectional view of FIG. 1D, each of the respective paths (depositions) of material 152 (152-1, 152-2, 152-3, etc.) includes a bulge 162 (such as protrusion, rounded edge, bump out, etc.) extending (protruding) into the cavity 1r. For example, the deposition of material 152-1 produces bulge 162-1 into the cavity 1r; the deposition of material 152-2 produces bulge 162-2 into the cavity 1r; the deposition of material 152-3 produces bulge 162-3 into the cavity; and so on.

Each successive pair of the paths of material 151 results in creation of a respective crevice. For example, the combination of bulge 161-1 and 161-2 creates crevice 171-1; the combination of bulge 161-2 and 161-3 creates crevice 171-2; and so on. In such an instance, the wall 131 includes multiple bulges 161 and multiple crevices 171.

Each successive pair of the paths of material 152 also results in creation of a respective crevice. For example, the combination of bulge 162-1 and 162-2 creates crevice 172-1; the combination of bulge 162-2 and 162-3 creates crevice 171-2; and so on. In such an instance, the wall 132 includes multiple bulges 162 and multiple crevices 172.

Thus, as further shown, the width of the cavity 1r varies along a respective height of the walls 131 and 132. For example, at respective bulges 161 and 162, the width of the cavity 1r is W1; at respective crevices 171 and 172, the width of the cavity 1r is W2, where W2>W1. The formation of the crevices 171 and 172 on the opposing walls 131 and 132 results in a respective creation of interlocks (of injected material) in the crevices 171 and 172 when the material 1B is injected into the respective cavity 1r.

It should be further noted that the combination of bulge 161-1 and substrate 1n creates crevice 171-0. A combination of bulge 162-1 and substrate 1n creates crevice 172-0. Thus, even a single deposition of material 151-1 and 152-1 on the substrate 1n and subsequent filling of cavity 1r via contact of the nozzle to upper surfaces of the depositions of material 151-1 and 151-2 fills in voids of respective crevices 171-0 and 172-0, resulting in interlocks as described herein. More specifically, the pressure of the material extruded from the nozzle causes the void of the crevices 171 and 172 to be filled with injected material (resulting in wireless station-content interlocks).

Embodiments herein are useful over conventional techniques because it allows faster printing of components, assemblies, etc. For example, fabrication of the respective walls 131 and 132 may require multiple passes of the print nozzle depositing respective material described as roads or paths of material. However, subsequent to fabrication of the respective walls 131 and 132, the nozzle 1c as described herein is able to perform a single pass to fill the respective cavity 1r instead of multiple passes of the nozzle otherwise required to create a solid object. Thus, creation of the cavity 1r to be sufficiently wide (via spacing of walls 131 and 132) and sufficiently tall (via one or more layer so deposited paths of material) enables high volume of injected material while reducing an amount of movement associated with the nozzle otherwise required to create a solid object. The height and width parameters of cavity 1r can be controlled to any suitable values.

Additionally, note that contact of the distal surface 1l of the nozzle 1c to the exposed top surfaces of the walls 131 and 132 to create a seal as shown in the drawings, enables injection of respective material at a high pressure that causes the injected material to fill the crevices (at a higher rate than if the cavy were filled via multiple nozzle passes creating deposition paths) between each of the successive layers of the walls 131 and 132. In other words the seal formed by the distal end of the nozzle 1c contacting the top of the respective walls 131 and 132 prevents the material from leaking out respective sides enforces the extruded material into the respective cavity 1r.

With respect to choosing the cavity size for the production of the part (such as component or assembly being fabricated), there are separate benefits for having large and small cavities. Smaller cavities afford higher print speeds, so the printed layers will tend to be produced more quickly and have slightly higher surface temperatures that promote diffusion and bonding. It can be desirable to print a wide cavity that is equal or less than the height of the adjacent road (such as deposition path) comprising a section of the shell, for example, to provide an aesthetic continuous surface or highly robust substrate for subsequent deposition and injection.

Larger cavities afford greater cavity length and widths, both being beneficial for different reasons. Larger cavity widths reduce the number of side-by-side cavities with internal shell walls that take time to produce and so extend the printing time. Larger cavity heights allow the injected material to traverse multiple layers of the printed shell and so produce parts that are stronger in the vertical (Z) direction. While smaller cavities do provide higher surface temperatures for the substrate, larger cavities have not had issues with diffusion and bonding. A reason is that larger cavities afford significant latent heat in the injected material such that the injected material can readily heat and bond with the surrounding shell surfaces.

In one nonlimiting example embodiment, the size of the cavity 1r is primarily chosen based on flow, structural, and thermal considerations as informed by analysis such as described by Kazmer in Injection mold design engineering, 2nd edition published by Carl Hanser Verlag GmbH Co KG in 2016. The flow of the injected material 1b will tend to enter the cavity in a radial fill pattern, first forming a spherical shape as it leaves the cavity 1r and then transitioning to a disk or cylindrical shape depending on the nearby surface constraints. Accordingly, the pressure required to fill the cavity 1r with a Newtonian fluid is the product of the flow rate, Q, and viscosity, eta, divided by the flow resistance, R.

It may be noted that the flow resistance for a Newtonian fluid is 12 times the flow length divided by the product of the cavity width and cube of the cavity thickness. For example, consider the filling of a 2 mm long rectangular cavity with a width and height both equal to 1 mm. If the viscosity is 100 Pa-s (Pascal-second) and the flow rate is 20 cubic millimeters per second, then the pressure required to fill the cavity is equal to 48 kPa or 7 psi (pounds per square inch). This amount of pressure is very small relative to achievable supply pressures of 10 MPa (mega Pascal-second) or more that were observed by "Coogan, T. J. and Kazmer, D. O., 2019. In-line rheological monitoring of fused deposition modeling. Journal of Rheology, 63(1), pp. 141-155." While this example assumes a Newtonian and isothermal flow, the results provide a useful order of magnitude estimate useful for design and processing purposes. More accurate analysis can be readily performed by analytical and numerical methods. The theory and practice both show that cavities with larger lengths and smaller widths or smaller heights can be readily filled with injected material, even when the material is much more viscous than 100 Pa-s, for example. Such flow analysis can be performed as part of the process for planning the forming of the shell walls and injecting the material into the cavities.

FIG. 2 illustrates the printing and injecting with offset adjoining cavities to maximize print speed and quality. This method has been found to be beneficial when using a nozzle having a limited distal surface such that multiple cavities are required to span the width of the part thickness. The example of FIG. FIG. 2 is for the production of an impact specimen that is 125 wide, 3.18 mm wide, and 12.7 mm high. Consider a nozzle having an orifice that is 0.4 mm wide with an adjoining distal surface that is 0.8 mm wide with a 0.1 mm radiused fillet transitioning to a 45 degree sloped outer surface. For the production of the impact specimen, suppose that the deposited roads are 0.5 mm wide. To produce a part having a width of 3.18 mm, it is expedient to print three shell walls such as shown in FIG. FIG. 2. Then, the two cavities formed between the interior shell wall and each of the two outer walls is approximately 0.84 mm; the cavities need not be the same width. The structure can be produced by depositing roads on a substrate or build surface $2a$ such as indicated by $2b1$ and $2c1$ and $2d1$ then the next layer $2b2$ and $2c2$ (not labeled) and $2d2$. Material can then be injected into cavity $2e$, after which additional roads $2b3$, $2c3$, $2d3$, $2b4$, $2c4$, and $2d4$ may be printed to form a cavity for injection of the material $2f$. The process can continue to produce additional cavities $2g$ and so on. As shown in FIG. 2, such a process allows the production of a part having material injected into offset cavities. Such a configuration improves the robustness of the part such that the offset or checkerboard pattern allow the adjoining column of the material to transfer the load across the part should a section of the part contain a defect or break during end-use.

FIG. 2 also demonstrates another feature, namely slight compression of the part during injection of the material into the cavity. As shown in FIG. 2, the nozzle $2h$ can place the shell in compression during injection of the material into a cavity $2i$. The amount of compression can be quite small, in this example 0.05 mm or one quarter of the deposit road height of the shell. The compression provides two benefits. First, it allows the injection of material into a cavity (having width W3) that is wider than the nominal distal surface of the nozzle such as in this case where the cavity is 0.84 mm wide while the distal surface of the nozzle is nominally (width Nw) 0.8 mm Second, the compression deposited material associated with walls 202 and 203) assists in forming a seal for retaining the injected material within the volume of the cavity $2i$ within the shell (formed from walls 202 and 203). The compression results in vertical displacement of the upper portions of the shell such as indicated by the dashed rounded rectangles $2c8'$ and $2d8'$ offset from corresponding undisplaced roads $2c8$ and $2d8$ (deposited materials forming walls 202 and 203). Note that the amount of deformation can vary according to the application requirements and may vary during production. In practice, in one embodiment, it is beneficial to provide relatively less vertical compression when injecting into the first few cavities since the relatively low vertical height above the substrate $2a$ of the fabricated component 210 part provides sufficient stiffness for making good seals with less compression.

As mentioned earlier, the size (nominal length, width, and height) of the cavity $2i$ is primarily chosen based on flow, structural, and thermal considerations. Continuing now with the structural considerations, the primary design and processing constraints are the strength and deflection of the shell wall upon application of internal pressure from the filling of the cavity by injection. Consider FIG. 2 with an injection of material from nozzle $2h$ into cavity $2i$.

The injection of material will result in a pressure P indicated by $2j$ and the adjoining set of arrows. If the applied pressure results in a shear stress greater than the bond strength of the layers, then the layers may rupture and the injected material may escape the shell. Some simple mechanics can be applied to provide useful estimates and guidelines for applying the invented methods. For example, the lateral force, F, on the side wall of the cavity is equal to the product of the cavity height, C, road length, L, and pressure, P. This results in a shear stress, tau, at the bottom of the side wall (between layers $2d4$ and $2d5$) equal to F divided by the product of the cavity height, C, and road length, L. Accordingly, the shear stress, tau, may be estimated directly as the pressure, P, times the ratio of the cavity height, C, to the road width, W. For example, suppose that P is 10 Mpa with C equal to 0.8 mm and L equal to 0.5 mm such as described for FIG. 2. Then, the shear stress, tau, is equal to 16 Mpa. These values are demonstrative and will vary in application.

However, the analysis and practice indicates that rupture of the shell wall is not a significant limiting constraint since applied pressures can be less than 10 Mpa and bond strengths can be greater than 16 Mpa. Further, it is straightforward to reduce by shear stress by reducing the road and cavity heights or increasing the road width or printing two or more adjacent roads to form the shell walls. The stress analysis is admittedly approximate but provided for demonstrative purposes and more accurate analysis can be readily performed by analytical and numerical methods. Such stress analysis can be performed as part of the process for planning the forming of the shell walls and injecting the material into the cavities.

The other structural issue is deflection of the shell walls during injection of the material into the cavities. Midway down the length of a long channel, away from the ends, the walls (such as walls 202 and 203) of the shell forming the cavity essentially act as a semi-infinite cantilever beam under a pressure load. The situation is also depicted in FIG. 2 via the dashed rounded rectangles $2d5\text{-}8'$ relative to the corresponding undisplaced roads $2d5\text{-}8$. The lateral outward deflection at the top of $2d8'$ can be estimated approximately as $4*P*C^4/(3*E*W^3)$, where E is the modulus of the material comprising the shell wall. The modulus will vary with the material composition and temperature during processing, but is typically one or more orders of magnitude greater than the cavity pressure P. For example, continuing with the prior description of FIG. 2, let E equal 1000 Mpa. Then the lateral deflection, d, is equal to 0.04 mm. The amount is measurable but readily managed in practice. It may be desirable to offset the position of the nozzle to favor the outer wall 203 to avoid leakage.

Alternatively, the size of the distal nozzle surface (of width Nw) may be increased or the width of the cavity decreased to avoid leakage. As other alternatives to avoid leakage, the deflection of the shell wall can be decreased by reducing the cavity height, or increasing the shell road width, or printing multiple adjoining roads to form a wider shell wall. Such outward deflections of the shell wall are not typically problematic, and in fact are beneficial insomuch as they compensate for volumetric shrinkage of the material injected into the cavity as it cools.

For example, a typical linear shrinkage of 0.5% for a cavity width of 0.84 mm would correspond to a uniform linear displacement of 0.042 mm on the shell side walls. Given that the displacement of the side wall is not uniform with respect to its height of the walls, a greater lateral displacement at the top of the cavity side wall is desired. A useful rule of thumb is twice the linear shrinkage of the cavity. For the prior example, the desired outward deflection to compensate for thermal shrinkage is around 0.08 mm. The deflection and shrinkage analyses are admittedly approximate but provided for demonstrative purposes and more accurate analysis can be readily performed by analytical and numerical methods. As with the previously described stress analysis, such deflection and shrinkage analyses can be performed as part of the process for planning the forming of the shell walls and injecting the material into the cavities.

As mentioned earlier, the size (nominal length, width, and height) of the cavity is primarily chosen based on flow, structural, and thermal considerations. Continuing now with the thermal consideration, the shell and cavity design and processing can consider the heat transfer and cooling of the printed and injected materials. The heat transfer can be readily modeled by heat conduction analysis in one, two, or three dimensions. Some related heat transfer analysis is described by Kazmer in Injection mold design engineering, 2nd edition published by Carl Hanser Verlag GmbH Co KG in 2016. A simple first order model for cooling, derived therein by solution of the heat equation for typical polymeric materials and processing conditions, is that the cooling time is approximately equal to the two times the squared apparent thickness (measured in mm) of the deposited or injected material. Here, the term "apparent thickness" is defined as the approximate distance required for conduction of heat from the hotter deposited material to a cooler heat sink below the solidification temperature.

For the example of printing a road for the shell wall of FIG. 2, the apparent thickness is the road height of 0.2 mm such that the approximate cooling time is 0.08 s. This cooling time is a relatively short compared to the printing time for a given layer. For the material injected into the cavity, the apparent thickness is equal to the cavity width plus some portion of the adjoining shell walls should they also be at an elevated temperature. For the example of FIG. 2, the apparent thickness for cooling is around 1.5 mm, which corresponds to a cooling time of 4.5 s. In practice, glossy finishes on the top and outer walls of the printed parts have been observed indicating longer cooling times with relaxation and smoothing of the cavity and outer walls. Such glossy finishes may be highly desirable in application not only for aesthetic purposes but also for structural performance since they are indicative of re-melting of the surrounding area and with it improved bond strengths and surface finishes.

Observed in practice of the injection printing method, material deposition rates can be so fast that the added heat exceeds the rate of cooling. For example, a test impact specimen was made having a length of 25 instead of 125 mm with all other conditions the same. The shorter length of the part resulted in an increased rate of heat input per layer relative to the amount of cooling. As such, the part was successfully produced but exhibited slight creep during production such that the height at the center decreased to 12.4 mm from 12.7 mm and the thickness increased to 3.4 mm from 3.2 mm. The majority of the part was also highly glossy rather than a matte finish as common in 3D printing of this grade of ABS.

The cooling analysis is admittedly approximate but provided for demonstrative purposes. More accurate analysis including improved modeling of the geometry and boundary conditions can be readily performed by analytical and numerical methods. Such cooling analysis can be performed as part of the process for planning the forming of the shell walls and injecting the material into the cavities. If the heat input undesirably exceeds the achievable rate of cooling, issues may be resolved by forced convective cooling, slowing the material deposition and injection rates, or producing multiple copies of the part in parallel to allow the parts to have more time to cool.

Table 1 below provides the processing and performance statistics for five tested impact specimens made by the prior art and described injection printing method. For these and all validation results presented herein, specimens were produced with a single spool of Acrylonitrile Butadiene Styrene (HATCHBOX ABS 3D Printer Filament, colored black) having a diameter of 1.75 mm and a dimensional accuracy+/−0.03 mm. As indicated in Table 1, the nominal temperatures and print speeds for both parts were the same, as were the specimens' length, width, and height dimensions. However, the replacement of the printed lines with injected cavities provides significant improvements in production time and part properties. Table 1 indicates that a constant print speed of 40 mm/second was used in the prior art method for printing the walls and internal grid-patterned fill. The same print speed was used for printing the shell walls by the injection printing method for comparison purposes with material injected into the internal cavities at a flow rate of 12.5 cubic millimeters per second. The injection printing method is readily practiced with varying print speeds and flow rates during production of the shell walls as well as the injection of material into cavities, and reasons for doing so may be (i) to speed up to decrease the production time or increase the heat input rate, or (ii) to slow down the velocity and flow rates when printing sharp corners or fine details, or minimize injection pressures when the cavity is nearly full, among other reasons.

TABLE 1

Production and performance statistics for impact specimens

| | Prior Art | Injection Printing |
|---|---|---|
| Build plate temperature | 100 °C. | 100 °C. |
| Nozzle temperature | 230 °C. | 230 °C. |

TABLE 1-continued

Production and performance statistics for impact specimens

| | Prior Art | Injection Printing |
|---|---|---|
| Wall/in-fill road height | 0.5 mm | 0.5 mm |
| Wall/in-fill road width | 0.2 nm | 0.2 mm |
| Print speed | 40 mm/second | 40 mm/second |
| In-fill | Printed grid, 100% by volume printed at print speed of 2400 mm/minute | Injected, 100% by volume injected at flow rate of 12.5 mm^3/second |
| Print time | 2940 seconds | 800 seconds |
| Charpy impact strengths | 12.93 kJ/m^2 | 13.39 kJ/m^2 |
| Charpy standard deviation | 0.79 kJ/m^2 | 0.56 kJ/m^2 |
| Efficiency | 13.5% | 49.6% |

In Table 1, the performance statistics were derived from test results for five specimens produced by the prior art and injection printing method; no outlying behavior was observed or discarded. In the development of these embodiments, it was found useful to consider the efficiency of the implemented methods relative to the theoretical capacity of the heating apparatus. For example, suppose that a machine is capable of processing 12 cubic millimeters/second of material. Inspection of prior art indicates that a typical 3D printing process deposits a road that is 0.4 mm wide and 0.2 mm high at a rate of 50 mm/second, which equals an output of 4 cubic millimeters/second. Then, the efficiency of the process would be the output 4 cubic millimeters/second divided by the theoretically possible 12 cubic millimeters/second, or 33%. With slowing and repositioning of the nozzle as well as starting and stopping of the material deposition, efficiencies are often less than 10%.

Another way to evaluate the overall efficiency is to evaluate the theoretical minimum print time relative to the actual print time. For example, suppose that a printed part has a volume of 6000 cubic millimeters. If the machine is capable of processing 12 cubic millimeters/second of material, then the theoretical minimum print time is 500 seconds. The actual print time may be observed to be 4000 seconds (s). Then, the efficiency of the process is 12.5%.

Referring back to Table 1, the volume of the impact specimen was 4,960 cubic millimeters. At production rate of 12.5 cubic millimeters/second, the theoretic minimum print time is 397 seconds. The prior art process has an efficiency of 13.5% relative to the minimum while the injection printing process has an efficiency of 49.6%. The primary limitation of the efficiency of the injection printing process is the relatively slow printing of the shell walls. This finding motivates (i) the dynamic variation of the shell walls by making them thinner and wider in proportion to the cross-section of the part to reduce the number of roads being deposited to form the internal and external shell walls, (ii) the elimination of internal shell walls by using a wider nozzle orifice and/or wider distal nozzle surface, and (iii) increasing the output capacity of the machine to further push the limits of the process once observed efficiencies are above 50%. All of these alternatives are subsequently explored in various embodiments.

Figure 3:
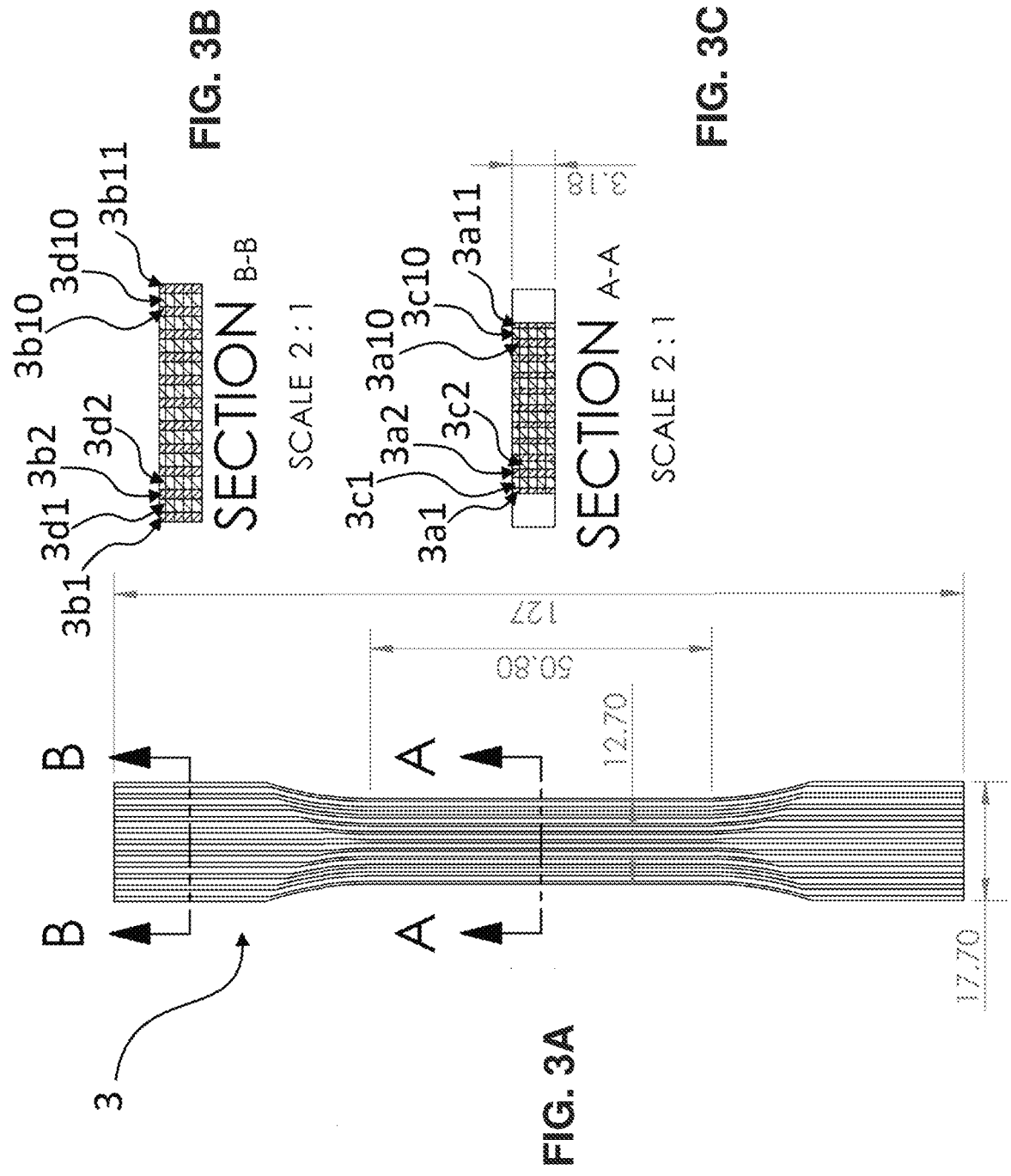
FIGS. 3A, 3B, and 3C, are example diagrams illustrating printing and injecting with varying road and cavity widths along a length of the part such as a tensile specimen according to embodiments herein.

Note that embodiments herein are not limited to rectilinear parts such as impact specimens. FIG. 3 illustrates printing and injecting with varying road and cavity widths along a length of the part to efficiently produce non-uniform shapes such as a tensile specimen. This part was produced with 11 shell walls that define 10 cavities along its 127 mm length; end walls were provided at each 17.7 mm wide end but are omitted for demonstrative purposes. At the middle of the part where the width is 12.7 mm, as illustrated in section A-A, the shell walls $3a1$-$11$ have a relatively thin width, on the order of the 0.5 mm while the adjoining cavities $3c1$-$10$ are slightly wider, on the order of 0.72 mm. At the ends of the part where the width is 17.7 mm, as illustrated in section B-B, the shell walls $3b1$-$11$ have a slightly wider, on the order of the 0.62 mm while the adjoining cavities $3c1$-$10$ are slightly wider, on the order of 1.09 mm By varying the width of the shell walls and cavity, the part can be produced without adding extra walls and cavities at the ends of the part that would otherwise be required if the roads and cavities were constant width. As such, the part can be more quickly produced and with improved part properties.

In one embodiment, the component 3 is produced using five layers of stacked cavities, each defined by shell walls formed with three stacked layers of roads. The bottom layer had a road height of 0.3 mm above which were 15 roads deposited with a height of approximately 0.19 mm to comprise the nominal part thickness of 3.18 mm. Accordingly, the first cavity had a nominal depth of 0.68 mm with the four cavities each above having nominal depths of 0.57 mm. If desired, part could have been produced with roads and cavities of varying heights as per the checkerboard pattern previously described with respect to FIG. 2 or some other arbitrary plan. Likewise, the part could be printed with more uniform shell wall and cavity widths, if desired, by introducing additional roads or cavities in the wider ends of the part or using fewer roads and cavities in the narrow section of the part.

Table 2 below provides the production and performance statistics for in-plane printed tensile specimens illustrated in FIG. 3. The print times for the prior art and injection printing method were 2700 and 880 seconds respectively, yielding efficiencies of 18.3 and 56.1% relative to the theoretical minimum print time of 494 seconds for a volumetric flow rate of 12.5 cubic millimeters per second. In the production of the in-plane printed tensile specimen, a volume of material was serially injected into each of the cavities located side-by-side down the length of the cavity. However, higher speed production would be readily achieved by using multiple nozzles to fill two or more cavities simultaneously.

TABLE 2

Production and performance statistics for in-plane printed tensile specimens

| | Prior Art | Injection Printing |
|---|---|---|
| Build plate temperature | 100 ° C. | 100 ° C. |
| Nozzle temperature | 230 ° C. | 230 ° C. |
| Wall/in-fill road height | 0.5 mm | 0.5 mm |
| Wall/in-fill road width | 0.2 mm | 0.2 mm |
| Print speed | 40 mm/second | 40 mm/second |
| In-fill | Printed grid, 100% by volume printed as grid at speed of 40 mm/second | Injected, 100% by volume injected at flow rate of 12.5 mm^3/second |

TABLE 2-continued

Production and performance statistics
for in-plane printed tensile specimens

|  | Prior Art | Injection Printing |
|---|---|---|
| Print time, per part | 2700 seconds | 880 s |
| Efficiency | 18.3% | 56.1% |
| Elastic modulus, mean ± sd | 1759 ± 50 MPa | 2070 ± 98 MPa |
| Ultimate stress, mean ± sd | 25.54 ± 1.38 MPa | 29.58 ± 3.89 MPa |
| Strain to failure, mean ± sd | 2.66 ± 0.32% | 3.61 ± 0.49% |

Table 2 also provides structural performance statistics derived from test results for five specimens produced by the prior art and injection printing method; no outlying behavior was observed or discarded. It is observed that significant increases in speed were achieved along with significant improvements in part properties. The improved properties are believed due to the greater density achieved with the injection printing method, approximately 10% greater with injection printing than the prior art method, as well as improved diffusion and healing associated of the injection printing method. During tensile testing, shear banding was observed at multiple points along the length of the injection printed specimens whereas the specimens produced by the prior art method failed in a brittle manner Inspection of the fracture surfaces revealed that the injection printed specimens had a larger internal fracture surface than the parts made by the prior art method.

Figure 4:
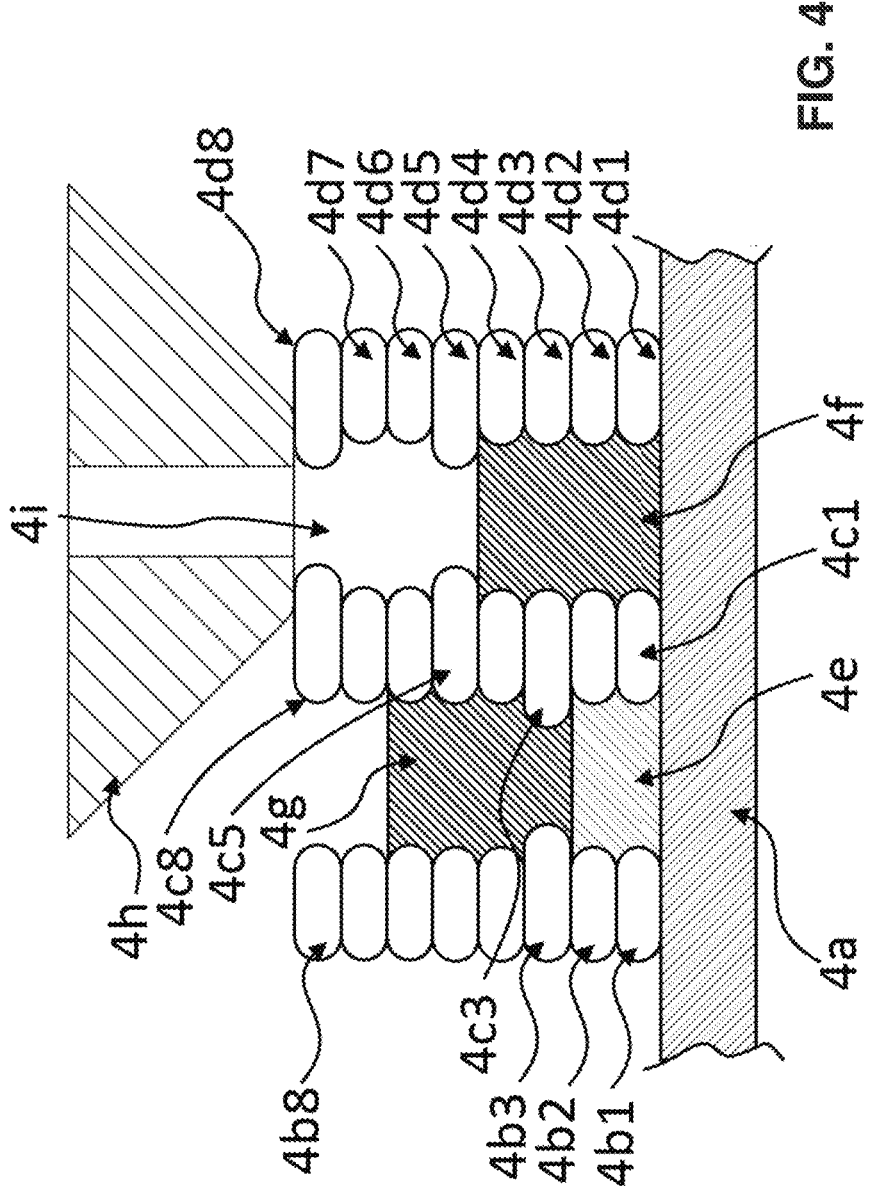
FIG. 4 is an example diagram illustrating printing and injecting with offset adjoining cavities of varying widths such as for a vertically oriented tensile specimen according to embodiments herein.

Also of interest is the strength in the vertical direction. Accordingly, a tensile bar was configured to print with its primary test length oriented in the vertical direction relative to a horizontal build plate. The part was produced with two cavities spanning the 3.2 mm thickness similar to the impact specimen as previously discussed with respect to FIG. 2. As shown in FIG. 4, the part was produce by printing the first two layers of printed shells, 4b1, 4c1, 4d1, 4b2, 4c2, and 4d2 after which cavity 4e was filled by injection. Then, shell layers 4b1 to 4d4 were deposited after which cavity 4f was filled by injection. The process continues with cavity 4g filled and 4i ready to be filled. A primary difference between the methods of FIG. 2 and FIG. 4 is that the offset adjoining cavities in FIG. 4 had varying widths of the printed shell such as shown by 4b3, 4c3, 4c5, 4d5, 4c8, and 4d8. The use of the varying shell wall thicknesses allows for (i) printing of a wider shell wall to increase the volumetric deposition rate while also (ii) increasing the contact area between the injected volume and the formed cavity and (iii) reducing the injection pressure to fill the cavity with the injected material given the wider shell walls located at the bottom of the cavity.

FIG. 4 illustrates printing and injecting with offset adjoining cavities of varying widths such as for a vertically oriented tensile specimen.

Given the small cross-sectional area of the vertically printed tensile bar as depicted in FIG. 4a it was found necessary to reduce the print velocity during conventional 3D printing less the part being produced melt and creep during production. Accordingly, the nominal print speeds were set to 10 mm/second as indicated in Table 3. For injection printing, the flow rate for injection of material into each of the cavities was set to 2.5 cubic millimeters per second. The print time per specimen was 16,500 seconds for the prior art process but only 5,700 seconds for the injection printing method, yielding respective efficiencies of 5.8% and 16.7% relative to a theoretical minimum print time of 950 s. It is observed that the injection printing method was 2.9 times faster than the prior art method; the injection printing methods were very hot and glossy with a slightly rougher outer surface and slightly increased thickness (5%) compared to the more slowly printed prior art specimens due to creep given the elevated temperatures of the vertically oriented tensile specimen during injection printing. It would seem the prior art method could achieve a similar production rate simply by increasing the print velocity from 10 to 29 mm/s since the linear print speeds are within normal operating limits. However, this is not the case as the prior art method did not successfully produce viable tensile specimens at this speed due to excess melting. It is noted that the efficiencies of both the prior art and injection printing process could be increased by fabricating multiple parts in parallel to provide additional cooling of the parts during production such that the print speeds could be increased above 10 mm/second.

TABLE 3

Production and performance statistics for
vertically printed tensile specimens

|  | Prior Art | Injection Printing |
|---|---|---|
| Build plate temperature | 100 °C. | 100 °C. |
| Nozzle temperature | 230 °C. | 230 °C. |
| Wall/in-fill road height | 0.5 mm | 0.5 mm |
| Wall/in-fill road width | 0.2 mm | 0.2 mm |
| Print speed | 10 mm/second | 10 mm/second |
| In-fill | Printed grid, 100% by volume printed as grid at speed of 40 mm/second | Injected, 100% by volume injected at flow rate of 2.4 mm^3/second |
| Print time, per part | 16,500 seconds | 5,700 s |
| Efficiency | 5.8% | 16.7% |
| Elastic modulus, mean ± sd | 1930 ± 33 MPa | 1863 ± 62 MPa |
| Ultimate stress, mean + sd | 23.2 ± 0.88 MPa | 24.4 ± 0.91 MPa |
| Strain to failure, mean + sd | 1.75 ± 0.10% | 2.32 ± 0.11% |

In Table 3, the performance statistics were derived from test results for five specimens produced by the prior art and injection printing method; no outlying behavior was observed or discarded. The performance statistics of Table 3 indicate that the injection printing method resulted in improved properties relative to specimens produced by the prior art. The exception was modulus, where there was a 3.5% decrease believed due to the creep and rougher surface of the injection printed surface.

All of the embodiments and results hereto (FIGS. 1-4 and Tables 1-3) pertained to injection printing with a conventional nozzle design, i.e. an orifice diameter of 0.4 mm and an adjoining distal surface diameter of 0.8 mm Such a small nozzle limits the width of the cavity that can be filled in a single pass without producing a smaller gate by using one or more converging shell walls such as that disposed between shell elements 4c8 and 4d8 for the inflow of material 4i shown in FIG. 4. While more complex shells can be printed to support larger cavities, the printing of the shell wall is a relatively slow process compared to the injection of the material into the cavity. Accordingly, the use of small nozzles often makes it necessary to decompose relatively thin parts, on the order of 3 mm thick or more than 4 times the distal surface diameter (for nozzles different than the conventional nozzle diameter described herein), into multiple parallel cavities with an internal shell wall as previously described. The need for printing of the internal shell wall(s) is generally disadvantageous since (i) it is slow compared to injecting the material into same volume of a wider cavity, and (ii) introduces potential failure modes associated with printing, injection, and end-use given the increased number of surface interfaces.

FIG. 5B illustrates an enlarged nozzle view of FIG. 5A with improved heat transfer and distal surface according to embodiments herein.

In this embodiment, an orifice 5a connects the distal surface 5b to an inlet 5d of nozzle 1c. The connecting flow channel is comprised of two cylindrical portions, a proximal portion (5d) that receives the filament and a distal portion (5a and 5b) that dispenses the extrudate material. The distal surface 5b also includes an optional flared portion 5c with cooling channels 5f for influencing the temperature of the distal nozzle surface. A connecting means 5e is provided to attach the nozzle to an upstream dispensing and temperature control mechanisms. For demonstrative purposes, in one nonlimiting example embodiment, the nozzle orifice diameter is 0.5 mm with a length of associated flow channel being 2.5 mm; these dimensions were specifically chosen to increase heat transfer and achievable flow rates relative to the prior art nozzle previously described. The distal surface diameter is 3.5 mm. The optional flared portion has a thickness of 1 mm with sixteen cooling windows that are 1 mm deep disposed uniformly about the nozzle perimeter. Note that the dimensions of the nozzle 1c vary depending on the embodiment.

In the nozzle 1c of FIG. 5B, the distal surface 5b may be flat or conical or curved (concave or convex) as indicated by element 5g in order to (i) improve sealing of the nozzle with the formed cavities, and (ii) provide additional compression to the injected material in the cavity as the nozzle traverses. In this embodiment, a conical shape is defined by the revolution about the nozzle centerline of an inclined line having an angle, a, of 1 degree relative to build plate (axis 520). For a distal surface diameter of 3.5 mm, this amount of incline provides 0.03 mm of compression relative to the center of the nozzle orifice. A fillet or round may be applied between the nozzle's distal surface and the optional flared surface.

Figure 6A:
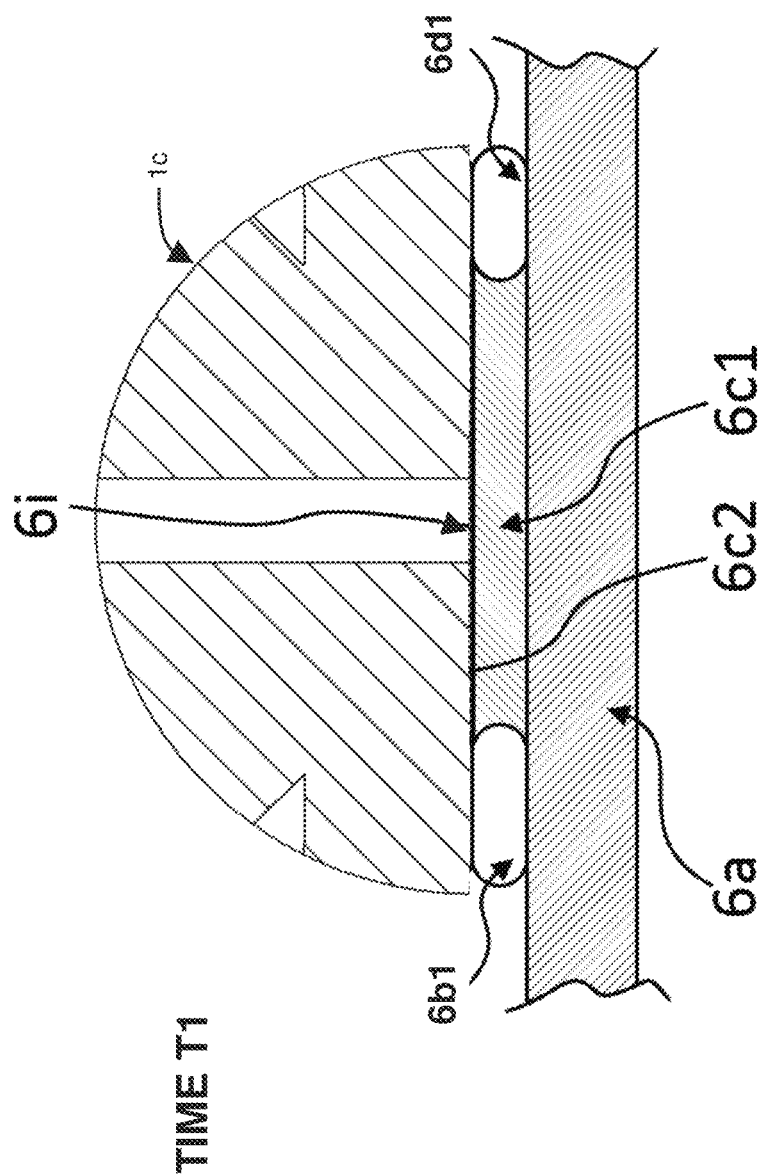
FIGS. 6A, 6B, and 6C are example diagrams illustrating printing and injecting with shell walls of varying widths according to embodiments herein.
Figure 6B:
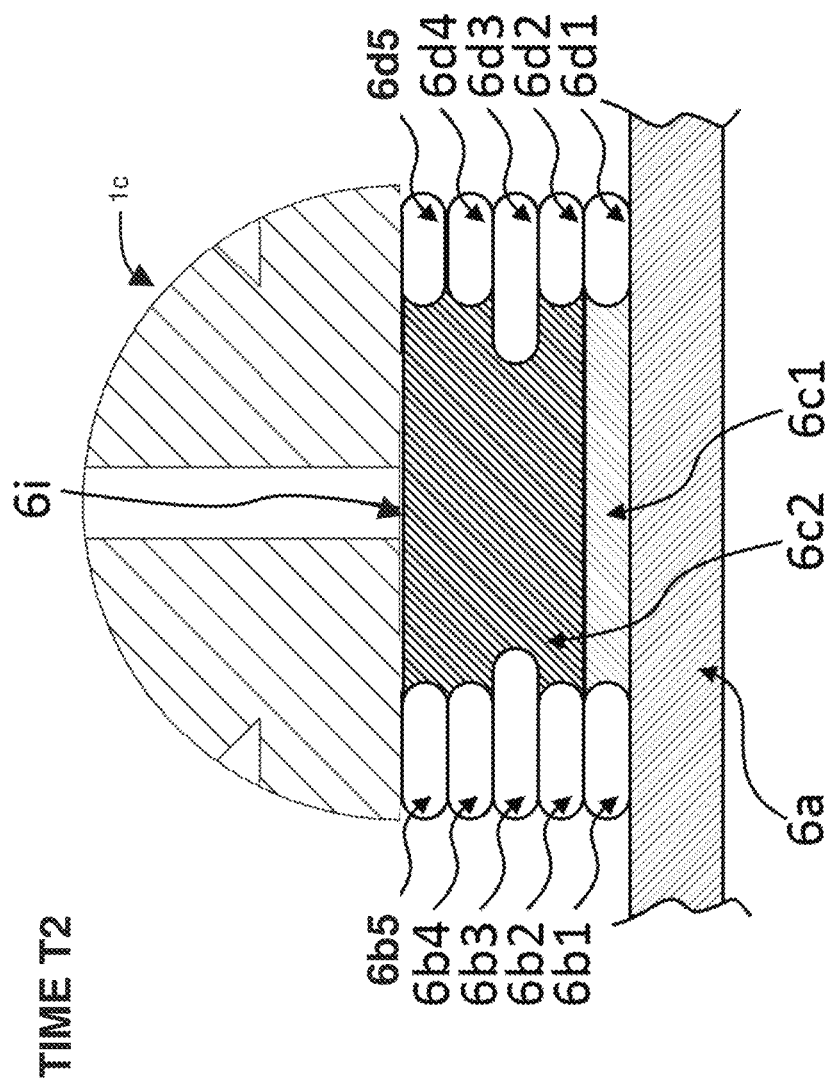
Figure 6C:
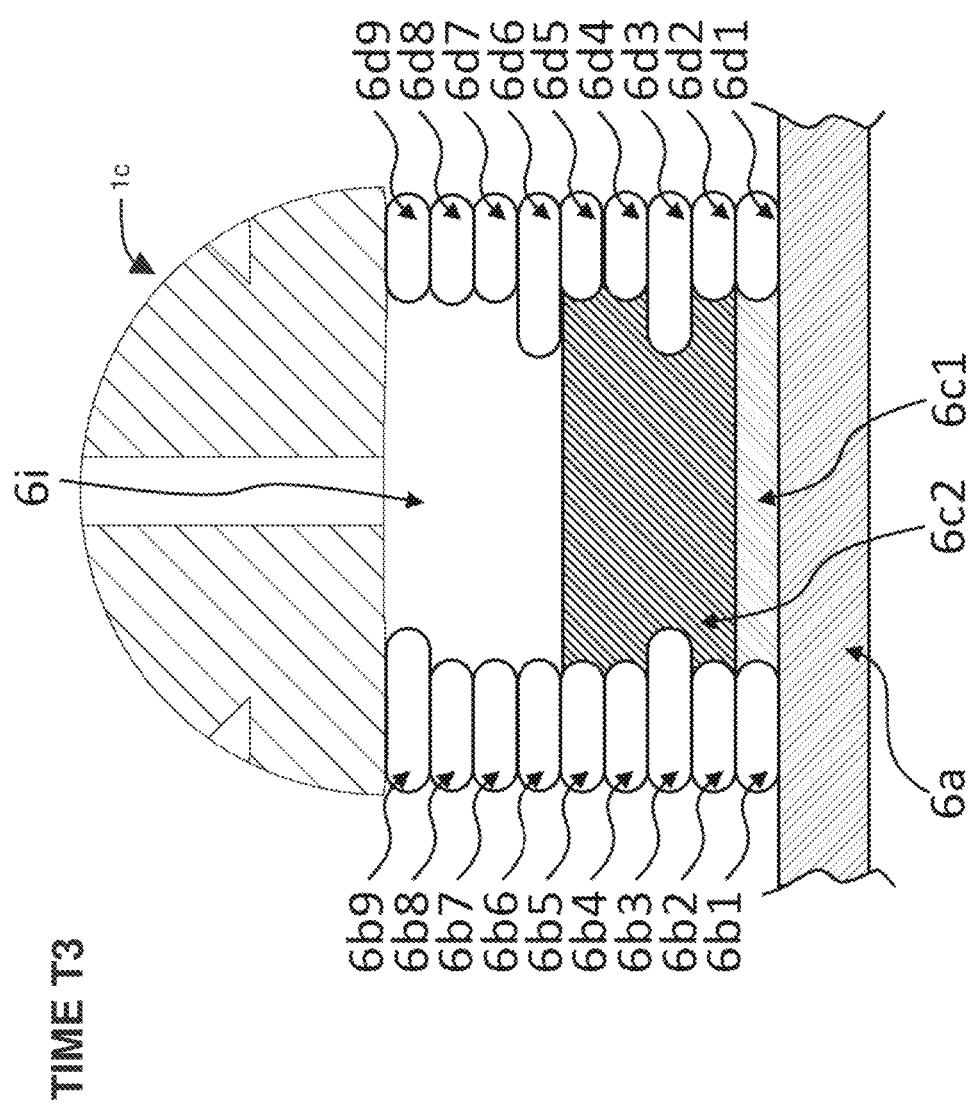

The use of a nozzle 1c with a wider distal surface allows the filling of cavities with larger cavity and gates. FIG. 6 (a.k.a., FIG. 6A, FIG. 6B, and FIG. 6C) shows an embodiment for producing an impact specimen similar to that for FIG. 2.

FIG. 6A is an example diagram illustrating fabrication of a first layer of material and filling a respective cavity according to embodiments herein.

As shown, the nozzle 1c or other suitable entity first deposits path of material 6b1 on the substrate 6a; the nozzle 1c or other suitable entity deposits path of material 6d1 on the substrate 6a. The path of material 6b1 in the path of material 6d1 create a respective cavity 6c1. The nozzle 1c then fills the created cavity 6c1 with a first material.

FIG. 6B is an example diagram illustrating fabrication of additional layers of material and filling of a respective cavity according to embodiments herein.

As shown, subsequent to fabricating the first layer of material including the path of material 6b1, path of material 6d1, and the filling of the respective cavity 6c1, the fabricator then operates the nozzle 1c (or another nozzle) to create stacking of path of material 6b2 on path of material 6b1; the fabricator then operates the nozzle 1c to create stacking of path of material 6d2 on path of material 6d1.

The fabricator then operates the nozzle 1c to create stacking of path of material 6b3 on path of material 6b2; the fabricator then operates the nozzle 1c to create stacking of path of material 6d3 on path of material 6d2. In this nonlimiting example embodiment, the fabricator operating nozzle 1c (or another nozzle) fabricates the path of material 6b3 to be wider than the path of material 6b2, resulting in protrusion of the path of material 6b3 into the respective cavity 6c2. The fabricator operating nozzle 1c (or another nozzle) fabricates the path of material 6d3 to be wider than the path of material 6d2, resulting in protrusion of the path of material 6d3 into the respective cavity 6c2.

The fabricator then operates the nozzle 1c (or another nozzle) to create stacking of path of material 6b4 on path of material 6b3; the fabricator then operates the nozzle 1c (or another nozzle) to create stacking of path of material 6d4 on path of material 6d3. In this nonlimiting example embodiment, the fabricator operating nozzle 1c fabricates the path of material 6b4 to be narrower than the path of material 6b3, resulting in a pronounced protrusion of the path of material 6b3 into the respective cavity 6c2. The fabricator operating nozzle 1c fabricates the path of material 6d4 to be narrower than the path of material 6d3, resulting in pronounced protrusion of the path of material 6d3 into the respective cavity 6c2.

The fabricator then operates the nozzle 1c (or another nozzle) to create stacking of path of material 6b5 on path of material 6b4; the fabricator then operates the nozzle 1c to create stacking of path of material 6d5 on path of material 6d4. In this nonlimiting example embodiment, the fabricator operating nozzle 1c (or another nozzle) fabricates the path of material 6b5 to be wider than the path of material 6b4, resulting in protrusion of the path of material 6b5 into the respective cavity 6c4.

After creating a respective first wall via paths of material 6b2, 6b3, 6b4, and 6b5, and creating a respective second wall via paths of material 6d2, 6d3, 6d4, and 6d5, the fabricator operates the nozzle (such as via movement along a respective axes in a manner as previously discussed) to inject a second material in the cavity 6c2.

FIG. 6C is an example diagram illustrating fabrication of additional layers of material and filling of a respective cavity according to embodiments herein.

As shown, subsequent to fabricating the five previous depositions of material and filling respective cavities 6c1 and 6c2 as previously discussed, the fabricator then operates the nozzle 1c to create stacking of paths of material 6b6 on path of material 6b5; the fabricator then operates the nozzle 1c to create stacking of path of material 6d6 on path of material 6d5. The fabricator operating nozzle 1c fabricates the path of material 6d6 to be wider than the path of material 6d5 beneath it, resulting in protrusion of the path of material 6d5 into the respective cavity 6c3.

The fabricator then operates the nozzle 1c to create stacking of path of material 6b7 on path of material 6b6; the fabricator then operates the nozzle 1c to create stacking of path of material 6d7 on path of material 6d6.

The fabricator then operates the nozzle 1*c* to create stacking of path of material 6*b*8 on path of material 6*b*7; the fabricator then operates the nozzle 1*c* to create stacking of path of material 6*d*8 on path of material 6*d*7.

The fabricator then operates the nozzle 1*c* to create stacking of path of material 6*b*9 on path of material 6*b*8; the fabricator then operates the nozzle 1*c* to create stacking of path of material 6*d*9 on path of material 6*d*8. The fabricator operating nozzle 1*c* fabricates the path of material 6*b*9 to be wider than the path of material 6*b*8 beneath it, resulting in protrusion of the path of material 6*b*9 into the respective cavity 6*c*3.

Accordingly, the fabricator operating the nozzle can be configured to control widths of each of the paths of material dispensed to fabricate the respective component. As previously discussed, the fabricator can use any number of nozzles to create the different layers of material (walls) or fill the respective cavities.

After creating a respective first wall via paths of material 6*b*6, 6*b*7, 6*b*8, and 6*b*9, and creating a respective second wall via paths of material 6*d*6, 6*d*7, 6*d*8, and 6*d*9, the fabricator operates the nozzle (such as via movement along a respective axis in a manner as previously discussed) to inject a third material in the cavity 6*c*3.

As previously discussed, the first material, second material, and the third material may be the same type of material. Alternatively, each of the first material, second material, and third material may be different types of material. In this manner, embodiments herein include encapsulating the second material in cavity 6*c*2 via respective walls material as well as the first material in the first cavity 6*c*1 and the third material in the third cavity 6*c*3.

The design of FIG. 6C uses optional wider shell walls such as 6*b*3, 6*d*3, 6*d*5, and 6*b*9 to increase the print speed of the shell wall while also increasing the interfacial area in the cavity. The embodiment of FIG. 6C depicts cavity 6*c*1 that has a height of only a single road (a.k.a., layer of material, path of material, deposition material, etc.) but spans the width between two opposing shell walls. Cavity 6*c*2 is subsequently defined by the printing of shell elements 6*b*2-46 and 6*d*2-4. The filling of cavity 6*c*2 provides interlocks with shell elements 6*b*3 and 6*d*3. Subsequently, the deposition of shell element 6*d*5, an upper portion of the shell wall 6*d* that is wider than a lower portion 6*d*4 of the shell wall, provides an interlock with the filled material occupying cavity 6*c*2. Accordingly, such interlocks may be created through either the printing of the shell wall or injection of material in the cavity, and either method can assist in increasing print speed or improving part properties.

FIG. 6C illustrates printing and injecting with nozzle of FIG. 5 with shell walls of varying widths according to embodiments herein.

The embodiments provided herein are for demonstrative purposes only, and not intended to limit the use and practice in any way. While several of the embodiments explicitly demonstrate the use of varying road widths in the printing of the shell, it is also possible and advantageous to vary the height of the roads while printing the shell. For example, road heights may be larger when printing the first layers or smaller when printing finer details or inclined sections. As such, the methods described and claimed for varying widths are understood to apply to roads of varying height as well as varying cross-sectional area as defined by the product of width and height.

Figure 7:
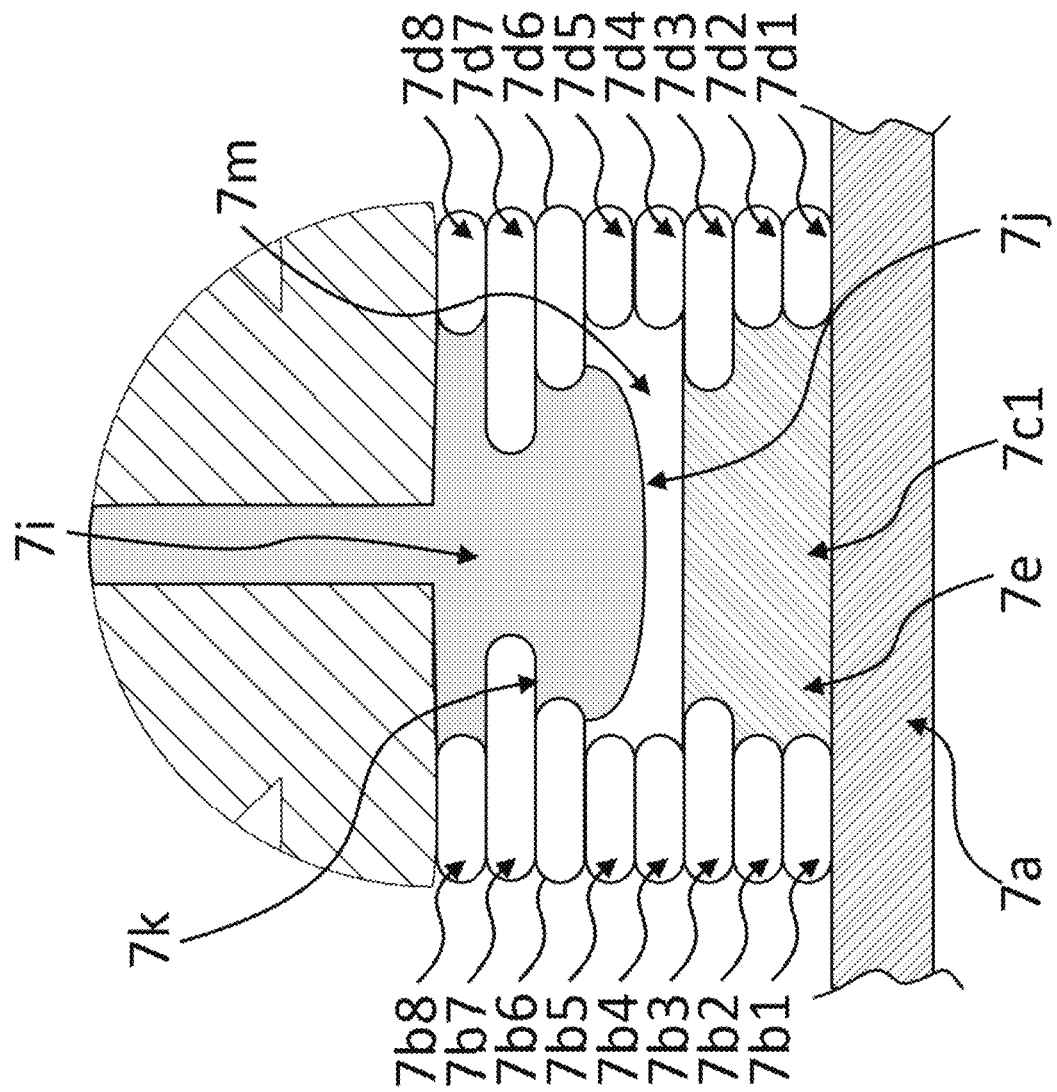
FIG. 7 is an example diagram illustrating printing and injecting with a partially filled cavity according to embodiments herein.

Furthermore, it is not necessary to completely fill the cavity such as shown in FIG. 7. Here, a cavity is defined by two shell walls 7*b* and 7*d* comprised of various elements. The material may be injected between elements 7*b*8 and 7*d*8, then encounter converging shell elements that constrain the flow of the material. In this case, the floor is defined by elements 7*b*7 and 7*d*7 that are respectively supported by 7*b*6 and 7*d*6 and the lower levels. The injected material will tend to flow in a radial pattern. By injecting only a fraction of the entire cavity volume, a rivet-type structure 7*j* may be formed to trap the injected material 7*i* with undercut portions such as 7*k* leaving unfilled portions 7*m* remaining in the cavity. In this manner, the injection printing method can be used to efficiently make hollow structure such as box beams that are relatively light and stiff.

The embodiment of FIG. 7 can also be used to provide structures to fasten or join dissimilar materials, such as nylon and ABS. It should be understood that while FIG. 7 is a cross-section, the embodiment is not intended to restrict the invention to extrusions of such a section. Indeed, it is understood that many such structures or other holes, slots, etc. could be used at different positions and orientations to form and fasten materials in multiple different directions. If so desired, the injection printing method can also produce a rivet-type structure within a slot of varying path to provide a sliding mechanism.

Figure 8:
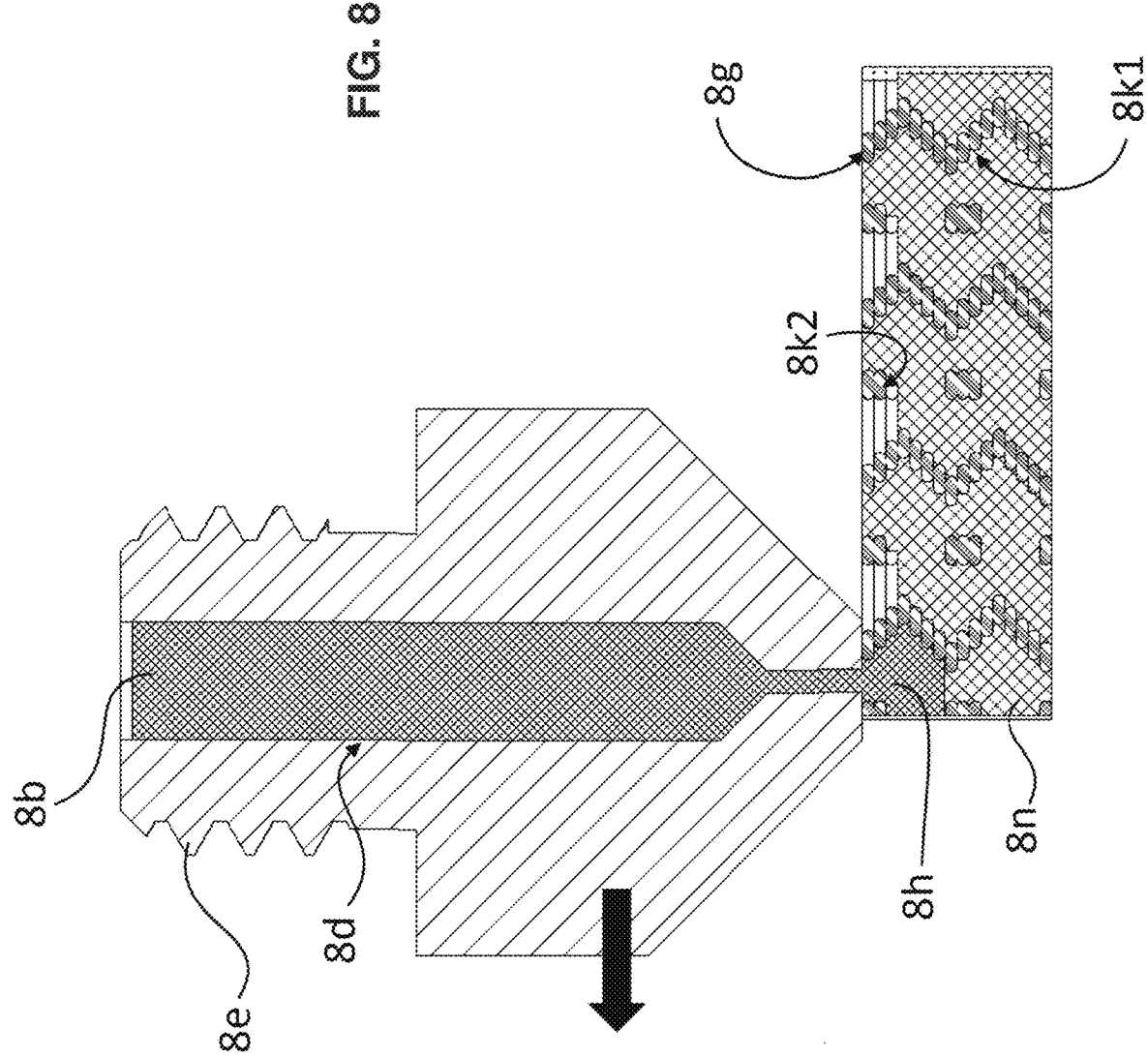
FIG. 8 is an example diagram illustrating printing and injecting with multiple filled cavities having converging and diverging shell walls according to embodiments herein.

FIG. 8 illustrates injection printing with a more complex printed shell and multiple filled cavities such as 8*h*. As the layers are sequentially deposited, additional internal cavities may be created and filled. While the former embodiments were directed to continuous injection printing with a nozzle traversing along a cavity defined by two walls of a shell, this embodiment illustrates the use of converging and diverging internal shell walls to comprise a plurality of interlocking internal cavities. For example, an interlock 8*k*1 may be formed through the printing of an internal wall that diverges and converges with respect to the xz plane. As another example, an interlock 8*k*2 may be formed through the printing of an internal wall that diverges and converges with respect to the yz plane. Such structures are just provided as examples and many other such structures can be defined with arbitrary shapes and orientations.

During development of the embodiments, it was realized that the conventional hot ends using a driven filament are limiting with respect to output flow rate capacity. Using the injection printing process, highly efficient processes can be provided that take advantage of 50% or more of the theoretical capacity of the machine. As shown, these processes have improved print speeds by a factor of 3-5 over the prior art. Further advances in production speed require increasing the output flow rate capacity of the machine, such as with nozzle geometries that induce greater heating of the driven filament at higher velocities.

The underlying theory is that the power, P, required to heat the filament is equal to the product of the volumetric flow rate, Q, and the density, rho, and the specific heat, C, and the temperature rise DT between the heated nozzle temperature T2 and the colder filament temperature T1, such that P=Q×rho×C×(DT), where DT=T2−T1. Approximate values for an acrylonitrile butadiene styrene (ABS) plastic are rho equal to 1 gram per cubic centimeter, C equal to 2 joules per gram degree Centigrade, T2 of 230 degrees Centigrade, and T1 of 20 degrees Centigrade. If the available power input P were known, then a target volumetric flow rate, Q, could be directly computed. While the power from the heater is known, much of this power is transmitted from the heated nozzle to the environment and adjoining machine elements. As such the amount of power transferred to the filament as well as the achievable target flow rate cannot be directly computed.

Figure 9:
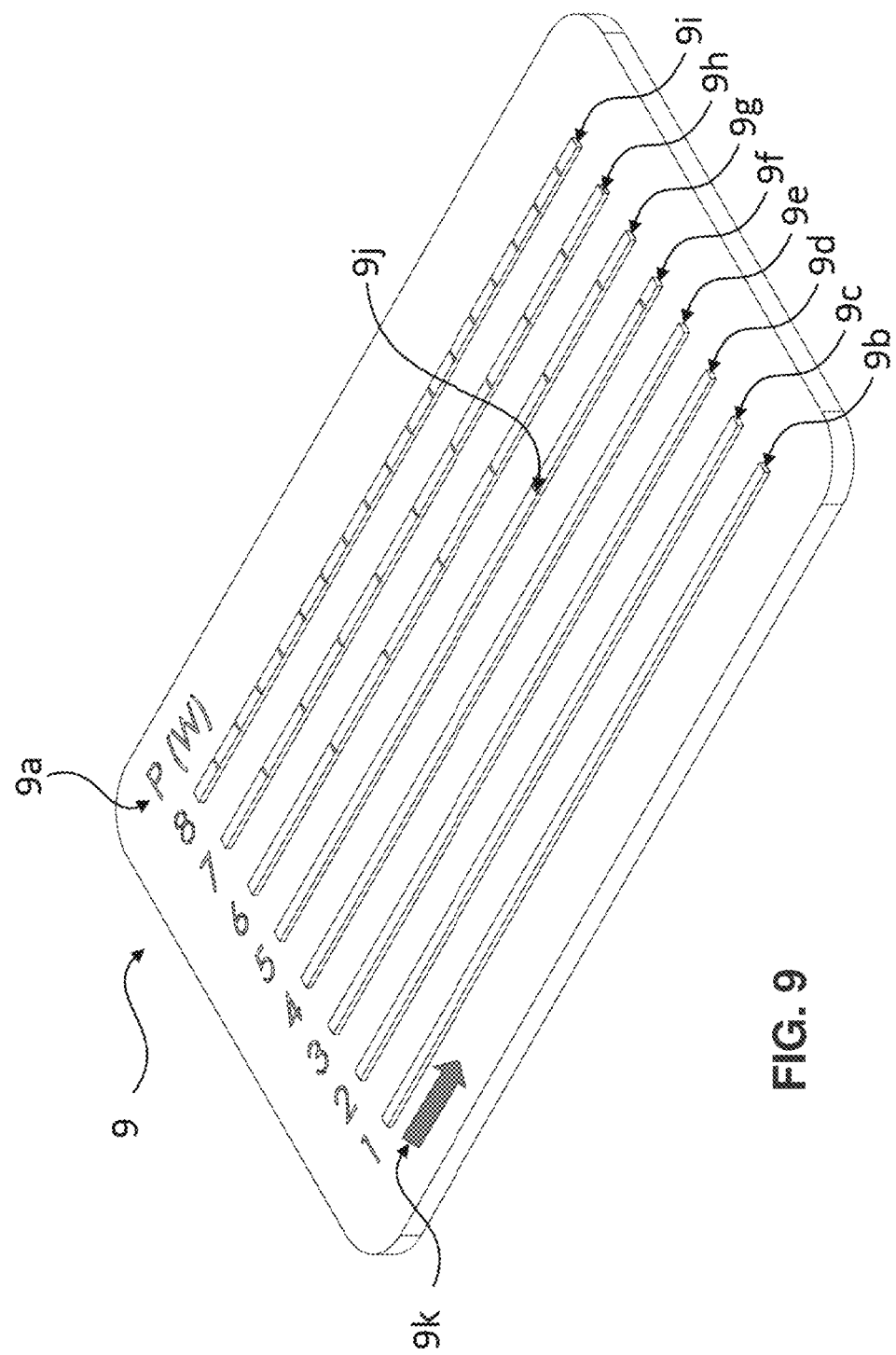
FIG. 9 is an example diagram illustrating printing of roads to characterize the maximum flow rate from a heated nozzle according to embodiments herein.

However, the maximum power input and associated flow rate can be readily characterized by printing a series of roads as shown in FIG. 9. In FIG. 9, a build plate 9a is marked with labeled power P in units of Watts with quantities varying from 1 to 8. The volumetric flow rate is then computed using the above equation. For example, if P is equal to 2 W, then the flow rate is computed as 0.005 cubic centimeters or 5 cubic millimeters per second for the previously described material and processing temperatures. The road 9b is printed at this flow rate with a specific width and height such as 0.5 and 0.3 mm respectively. Arrow 9k indicates the print direction. The flow rate can then be progressively increased to assess the system's heating capability such as indicated with roads 9c-j corresponding to assessed heating power of 2-8 W.

At some value of increased flow rates, the filament is flowing through the nozzle too quickly to allow adequate heat transfer. At the lower temperature of the material being processed, the viscosity of the material will increase making the material difficult or impossible to force through the nozzle given the available force or torque driving the filament. At this point, the feed gear will tend to slip along the filament and the filament will temporarily remain stationary until it is sufficiently hot to flow through the nozzle. The stalling of the filament can be detected by a number of ways including (i) the use of a filament position sensor such as described by "Coogan, T. J. and Kazmer, D. O., 2019. In-line rheological monitoring of fused deposition modeling. Journal of Rheology, 63(1), pp. 141-155," (ii) by an audible noise such as a clicking sound emitted by the toothed gear slipping over the filament, or (iii) by appearance of indents or divots in the deposited roads such as shown by 9j in FIG. 1. The reason the divots appear is that the nozzle continues to traverse while the melt flow has decreased due to stalled filament. As such, the appearance of divots is an indicator that insufficient heat is being transferred to the filament. The behavior indicated in FIG. 9 is for a QIDI XPRO printer with a 20 W heater disposed in a hot end connected to a nozzle with a 0.4 mm nozzle orifice and 1.6 mm nozzle length. Interestingly, as shown in FIG. 9, the indents do not immediately emerge when starting the printing at increased flow rates. The reason is that there is significant latent heat in the nozzle and adjoining area to support the increased flow rates. However, once that latent heat is consumed by the rapidly flowing filament, a regular stall and indent pattern tends to emerge.

This investigation suggests that this particular nozzle design is capable of a heating power of 5 W, corresponding to a volumetric flow rate of 12.5 cubic millimeters per second. For a typical road of 0.5 mm wide and 0.2 mm high for a cross sectional area of 0.1 square millimeters, this volumetric flow rate would correspond to a linear print velocity of 125 mm per second or 7,500 mm per minute, well above the print speed of this particular printer (a QIDI XPRO) and most printers in general. However, the injection printing method allows much higher material flow rates by injecting larger volumes into a relatively large cavity without requiring significant traversing velocities. The target volumetric flow rate, Q, can be used to directly compute the minimum cavity dimensions required to utilize the full capacity of the 3D printer. For example, consider an injection printing application with Q equal to 12.5 cubic millimeters per second and a traversing print speed, V, of 20 mm/s. Then, the cross-sectional area, A, of the cavity to fully utilize the printer is $A=Q/V$, which equals 0.625 square millimeters. As such, a cavity that is 1 mm wide and 0.625 mm high would fully utilize the extruding capability of the 3D printer. Larger cavities can, of course, be produced. For example, a cavity with a width of 2 mm and a depth of 1.25 mm would have a cross-section area of 2.5 square millimeters, and so would be filled at a typical velocity, $V=Q/A$, which equals 5 mm/s. While the traversal velocity seems slow, the extruding capability of the 3D printer is being fully utilized. A typical printer may deposit a filament that is 0.4 mm wide and 0.2 mm high at a speed of 40 mm/s. This process corresponds to a volumetric flow rate of 3.2 cubic millimeters per second, a full factor of 4 lower than the injection printing method implemented on the same printer. In practice, I have observed speed increases of a factor of more than 3-5. The speed increase is not just due to the greater volumetric flow rate afforded by the injection printing method, but also due to less repositioning of the nozzle required for traditional 3D printing of complex fill patterns composed of many more smaller roads. While the foregoing theory suggests a hard limit to the volumetric flow rate, experimentation has shown that it is possible to print at high volumetric flow rates if some slight filament slippage is acceptable. For example, FIG. 9 demonstrates that a road was successfully deposited equivalent to a power input of 8 W, thereby achieving a volumetric flow rate of 20 cubic millimeters per second albeit with a slightly reduced bulk melt temperature and intermittent indents on the top surface of the filament.

Figure 10:
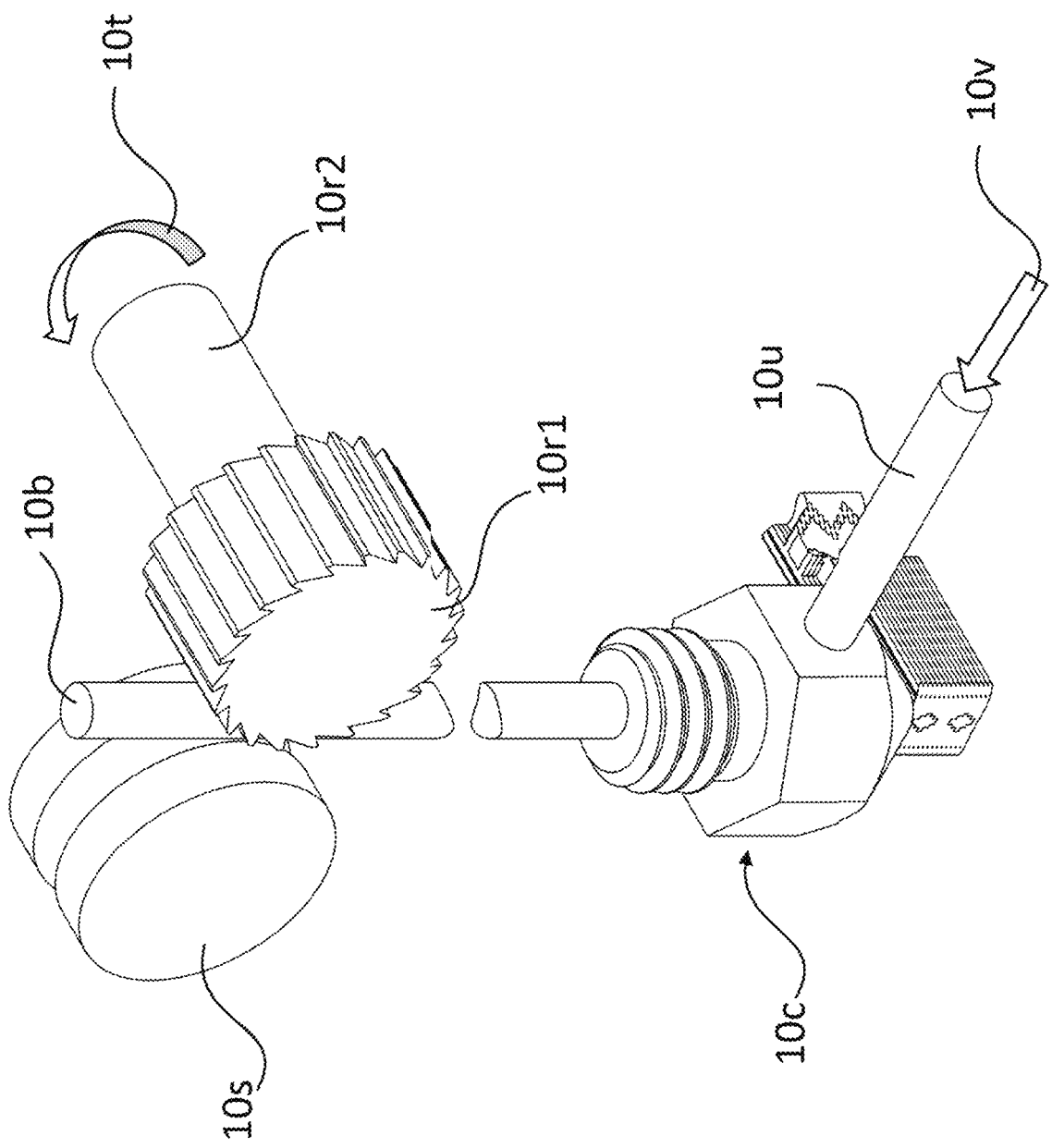
FIG. 10 is an example diagram illustrating injection printing with pressure sensing according to embodiments herein.

FIG. 10 illustrates injection printing with sensing means. In this embodiment, the supply pressure can be monitored and controlled to improve the performance and quality of the printed parts. One approach is to provide a transverse bore in the side of the nozzle 10c by which a load column 10u contacts the pressurized portion of the material feedstock 10b. The reaction force 10v to hold the load column in place can then be measured using a load cell or strain gage (not shown). The supply pressure can then be determined by the magnitude of the reaction force 10v divided by the exposed area of the load column. Alternatively, it is possible to install a pressure transducer elsewhere along the length of the flow bore in the nozzle or connected components (not shown) to directly monitor the supply pressure.

Another approach for driven filaments is to monitor the torque applied to the drive wheel that feeds and pressurizes the feedstock material. As shown in FIG. 10, such systems may employ an idler wheel 10s that guides the filament and provides a reaction force to the drive wheel 10r1 containing tooth elements to engage the filament. The torque 5t applied to the drive wheel shaft 10r2 may then be measured using a torque sensor or strain gage (not shown), or estimated using the supply current to the drive motor. The supply pressure can then be determined as the supplied torque divided by the product of the effective radius of the drive wheel 10r1 and the cross-section area of the filament 10b.

During operation, the supply pressure represents the sum of two main components: (1) the pressure at the nozzle tip orifice located at the exit of the nozzle bore 1i, and (2) the pressure drop associated with the material flowing through the nozzle tip bore. By purging the feedstock material into open space and allowing the pressure at the nozzle tip orifice to equal atmospheric pressure, the pressure drop associated with the viscous flow of the melt through the nozzle tip bore can be characterized as a function of flow rate and temperature. A viscosity model can be derived if desired and used to determine the melt viscosity during the print operation. The determined melt viscosity can then be monitored for consistency and optimality. The melt viscosity can be adjusted and maintained within a preferred range by changing the temperature and flow rate settings.

Knowing the melt viscosity and flow rate, the injection pressure at the exit of the nozzle orifice can be determined as the difference between the supply pressure and the pressure drop associated with the flow of the injected material through the nozzle bore. The magnitude of the injection pressure will vary by application including material properties and deposition geometry. However, preferred injection pressures will vary from 0.01 to 100 MPa with a typical value on the order of 1 MPa. During delivery of the injected material, the melt pressure can be monitored to ensure sufficient filling of the internal cavities. Similar to injection molding processes, the injected material will tend to exhibit volumetric shrinkage as it cools due to its coefficient of thermal expansion. Excessive volumetric shrinkage will result in the development of internal tensile stresses and voids that can negatively affect the dimensions and strength of the printed part. Accordingly, the flow rate of the injected material may vary over time with the nozzle slowing or dwelling to supply an appropriate volume of injected material by maintaining the injection pressure using closed loop control akin to the packing and holding stages of injection molding.

In some of the embodiments described herein (e.g. FIG. 8), the surfaces of the internal cavities converge to provide an injection location that has a projected area that is smaller than the projected area of the distal surface of the nozzle tip. In such applications, it is possible to position the distal nozzle surface slightly above the top surface of the surrounding shell. The injected material can then be delivered to provide a desired injection pressure. Then, the flow of material from the nozzle can be stopped and the desired injection pressure maintained by moving the nozzle towards the surface of the printed part to compensate for volumetric shrinkage, akin to injection compression molding. Since the volumetric shrinkage of the injected material is relatively small, small nozzle displacements (typically less than the printed layer height) are required to maintain the desired injection pressure.

The machine instructions for printing the shells and injecting material into the internal cavities may be programmatically generated. One procedure is to take a horizontal cross-section of the part geometry and define print paths to create the outer shell. Internal shell walls can then be generated including diverging and converging surfaces, gaps for interlocks and vents, and other features such as through holes, etc. The number and location of the internal shell walls can be determined according to proscribed constraints, including for example the inclined angle of the diverging and converging surfaces, maximum thickness of volume of the internal cavities, etc. Based on the shell structures such as shown for FIGS. 1-8, the injection locations, volume, and volumetric flow rate for filling each internal cavity can be determined. One or more additional layers can then be defined for the printed of a top shell structure if desired. As implied by the different hatch patterns in FIG. 8, the injected material 8h may vary from shell material 8g as well as the previously filled cavities or substrates 8n.

Figure 11:
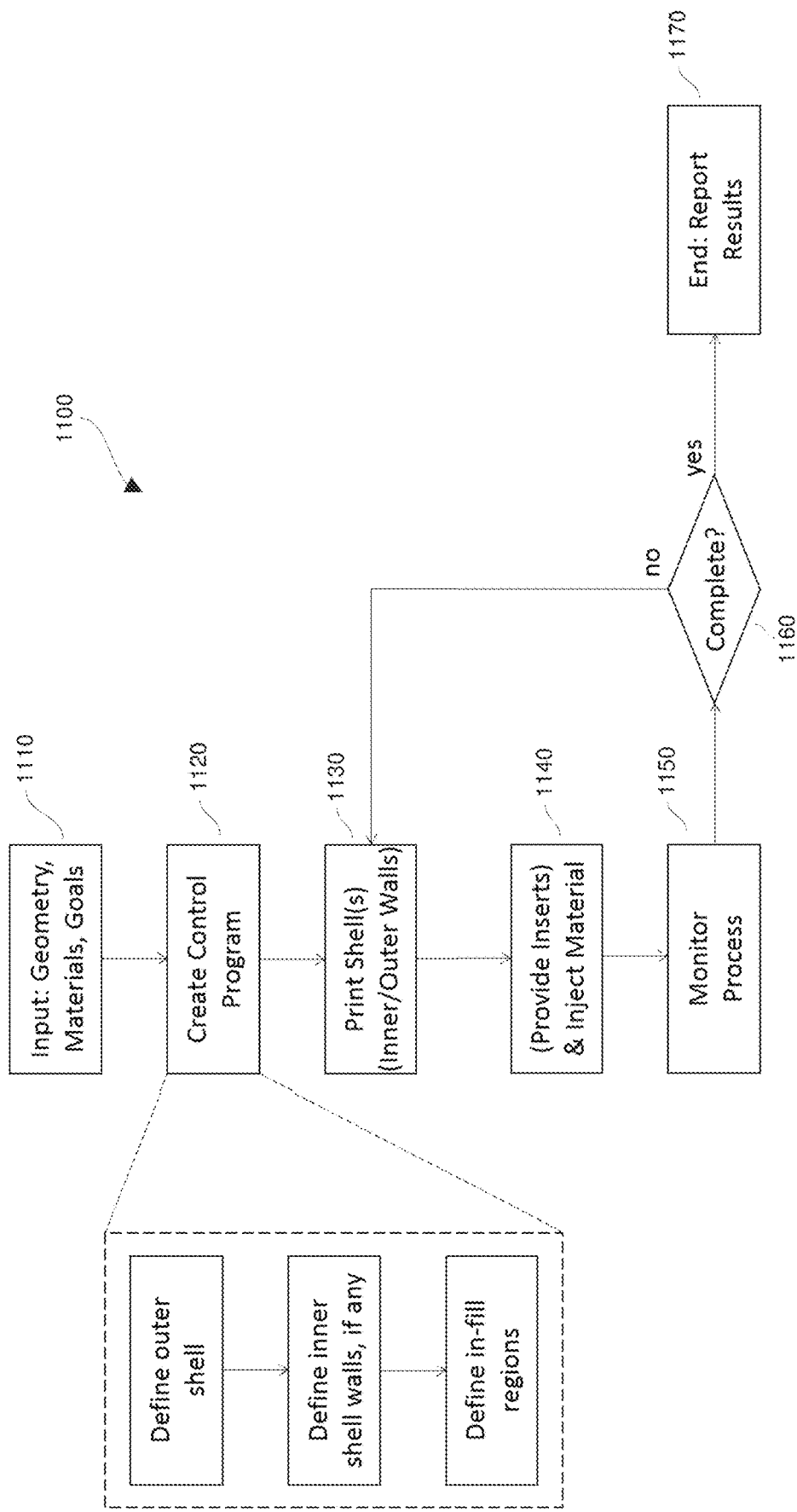
FIG. 11 is an example flow chart describing system operation according to embodiments herein.

FIG. 11 provides a flow chart 1100 for the general injection printing process. Not all indicated operations are required, and additional operations may be readily implemented according to application requirements. The operation 1110, inputs to the process are the part geometry, materials, goals and other optional inputs such as nozzle geometry, processing constraints, etc. Via operation 1120, a machine control program (sometimes in the form of g-code) is developed that defines an outer shell, optional inner walls, and the filled cavities. An iterative loop (such as including operation 1130, 1140, 150, 1160) then prints the outer shell and inner walls and filled cavities. As indicated by the term "(Print Inserts)" in operation 1140 of flowchart 1100 in FIG. 11, the process can optionally be paused between printing of the shell and injecting into the cavity to allow for insertion of components. The process can be continuously monitored such as described with respect to FIG. 10. Further iterations on the printing loop (operations 1130, 1140, 1150, 1160) can be performed until the part is fully printed. Afterwards, such as via operation 1170, a report of the printing process can be provided including, for example, estimates of the part weight, cost, and quality.

The injection printing system was designed to process different materials for use in the printed shell and internal cavitied to support a variety of applications. Table 4 provides a list of some alternative materials and their potential applications. Of course, it is understood that potential materials are much more diverse than those listed in Table 4, and that these materials may be reversed with respect to their use in the printed shell and internal cavities. Accordingly, the injection printing system has many potential applications.

TABLE 4

List of materials/properties

| Filled cavity property | External shell property | Application |
| --- | --- | --- |
| Red | Grey | Aesthetic housings |
| Hard | Soft | Tactile/ergonomic devices |
| Conductive | Insulating | Electronic circuits |
| Transparent | Opaque | Optical devices |
| Recycled | Virgin | Environmental products |
| Foam | Fiber-filled composites | Lightweight structures |
| Living cells | Support media | Tissue scaffolds |
| Active drugs | Protective carrier | Pharmaceuticals |
| Nutrients | Food | Custom edibles |

As a result of these foregoing embodiments, the fabrication rate of additively manufactured products is greatly increased, for example: typically two to five times without substantial hardware changes, and more than five times with improved hardware designs. Results, of course, will vary by application, hardware design, and the elegance of the software control and hardware design to the application requirements.

The foregoing embodiments were provided for demonstrative purposes only and not intended to limit the injection printing method in any way. Many different designs, materials, and processes are thus enabled by the claimed invention. Generally, the methods described herein are directly applicable or extensible to processed materials having appropriate viscosities, generally between 2 and 20,000 Pa s, such that they are sufficiently stable upon extrusion to retain their shape until they are cured. While ABS was used for validation purposes herein, the injection printing method can be applied to other thermoplastics such as high impact polystyrene (HIPS), polylactic acid (PLA), polyamide (PA), polycarbonate (PC), polyetherimide (PEI), thermoplastic polyurethane (TPU), and others. Thermoset materials may also be processed such as cyanate ester, epoxy, phenolic, polyester, polyimide, polyurethane, silicone, and others given appropriate chemistries and curing rates. Also of interest are fusible and eutectic alloys that can be readily melted and cured. Such alloys in Bi58 (an alloy of 58 weight percent bismuth and 42 weight percent tin), eutectic solder (an alloy of 63 weight percent tin and 37 weight percent lead), KappAloy9 (an alloy of 91 weight percent tin and 9 weight percent tin), and Sn 100 (99 or more weight percent tin). The feedstock materials for extrusion or injection may contain additives such as colorants, fibers, particles, platelets, and other property modifiers as known by one of ordinary skill.

Figure 12:
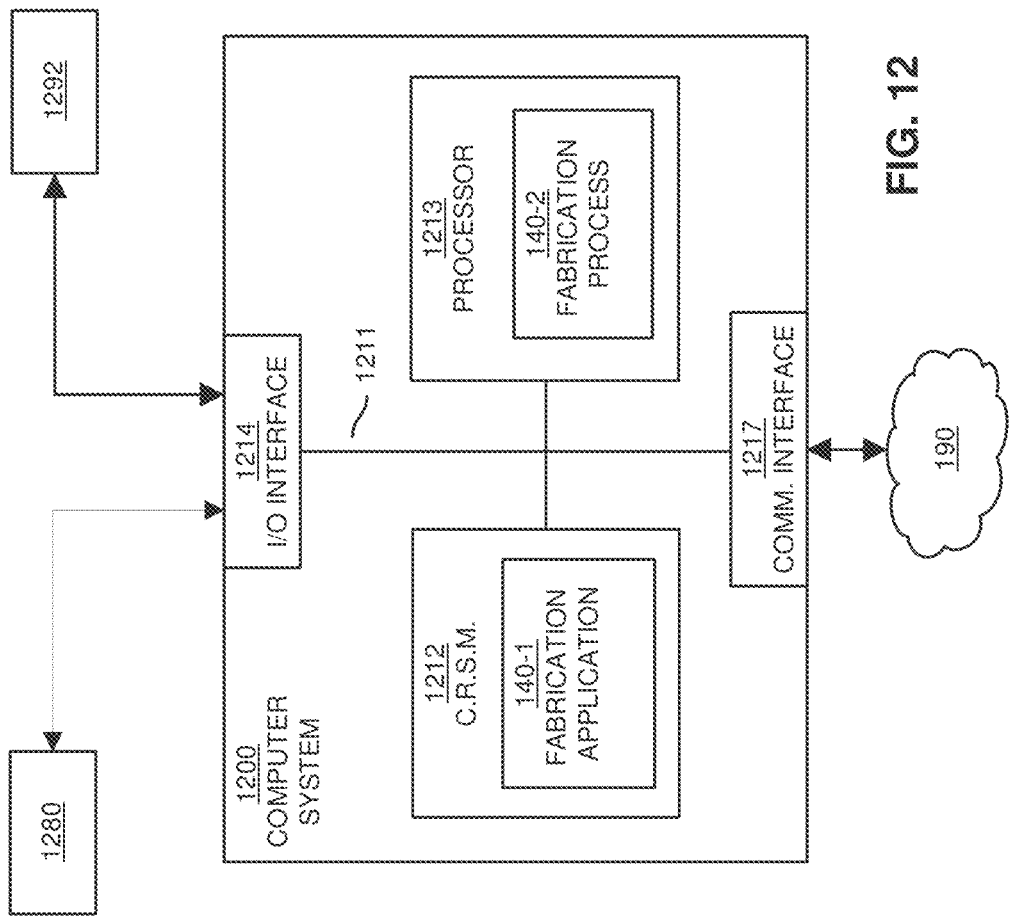
FIG. 12 is a diagram illustrating example computer architecture to execute one or more operations according to embodiments herein.

FIG. 12 is an example block diagram of a computer system for implementing any of the operations as previously discussed according to embodiments herein.

Any of the resources (such as fabrication resource 140, etc.) as discussed herein can be configured to include computer processor hardware and/or corresponding executable instructions to carry out the different operations as discussed herein.

As shown, computer system 1200 of the present example includes an interconnect 1211 that couples computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with the fabrication application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in management application 140-1 stored on computer readable storage medium 1212. Execution of the fabrication application 140-1 produces fabrication process 140-2 to carry out any of the operations and/or processes as discussed herein.

Those skilled in the art will understand that the computer system 1200 can include other processes and/or software and hardware components, such as an operating system that controls allocation and use of hardware resources to execute fabrication application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1200 may reside at any location or can be included in any suitable resource in any network environment to implement functionality as discussed herein.

Figure 13:
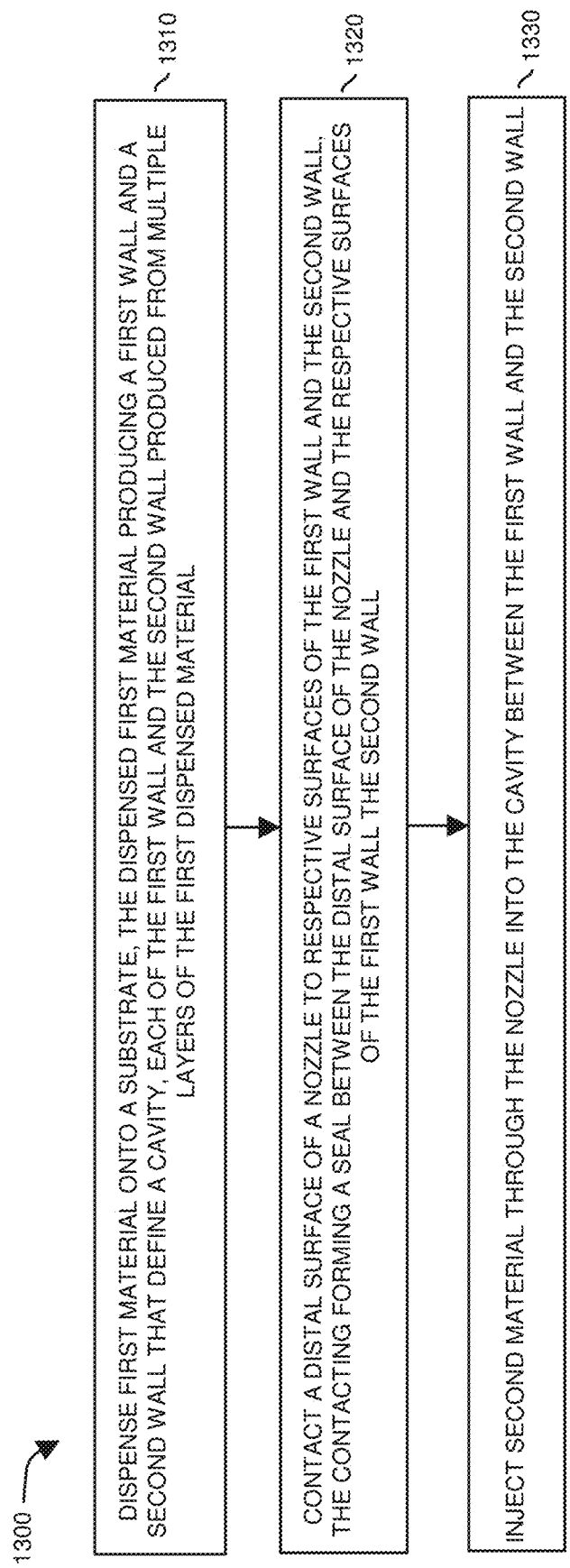
FIG. 13 is an example diagram illustrating a method according to embodiments herein.

FIG. 13 is a flowchart 1300 illustrating an example method according to embodiments. Functionality supported by the different resources will now be discussed via flowcharts in FIG. 13. Note that the steps in the flowcharts below can be executed in any suitable order. Note that there will be some overlap with respect to concepts as discussed above.

In processing operation 1310, the fabricator 140 dispenses first material onto a substrate 1n, the dispensed first material producing a first wall 131 and a second wall 132 that define a cavity 1r, each of the first wall 131 and the second wall 132 being produced from multiple layers (depositions of material 151 and depositions of material 152) of the first dispensed material.

In processing operation 1320, the fabricator 140 contacts a distal surface 1l of a nozzle 1c to respective (top) surfaces of the first wall 131 and the second wall 132. The contact of the distal surface 1l to the surfaces of the first wall 131 and the second wall 132 form a seal between the distal surface of the nozzle 1c and the respective surfaces of the first wall 131 the second wall 132.

In processing operation 3030, the fabricator injects second material through the nozzle 1c into the cavity 1r between the first wall 131 and the second wall 132.

Note again that techniques herein are well suited to facilitate fabrication of components using layered printing. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method of 3D printing comprising:
dispensing a first material to fabricate a first wall and a second wall on a substrate, the dispensed first material producing the first wall and the second wall that define a cavity, each of the first wall and the second wall produced from multiple planar layers of the dispensed first material, wherein the first wall is fabricated at a first height with respect to the substrate, wherein the second wall is fabricated at a second height with respect to the substrate, the second height being equivalent to the first height;
contacting a distal surface of a nozzle to respective surfaces of the first wall and the second wall, the contacting forming a seal between the distal surface of the nozzle and the respective surfaces of the first wall and the second wall, wherein the distal surface of the nozzle forming the seal is in contact with both: i) a first flat surface disposed on a top planar layer of the first wall, and ii) a second flat surface disposed on a top planar layer of the second wall;
injecting a second material through the nozzle into the cavity between the first wall and the second wall, wherein a width of the cavity between the first wall and the second wall is greater than a width of the first wall, wherein the width of the cavity between the first wall and the second wall is greater than a width of the second wall; and
repeating operations of the dispensing, the contacting, and the injecting to produce a printed part having regions of layer-wise printed material via the dispensing of the first material and regions of bulk filled material via the injecting of the second material, wherein the regions of bulk printed material are larger than the regions of layer-wise printed material.

2. The method as in claim 1, wherein the first material is the same as the second material.

3. The method as in claim 1, wherein the second material is different than the first material.

4. The method as in claim 1, wherein the second material injected into the cavity becomes interlocked with the first wall and the second wall based on variations in the width of the cavity between the first wall and the second wall.

5. The method as in claim 1, wherein the distal surface of the nozzle is a distal planar surface of the nozzle in contact with the respective surfaces of the first wall and the second wall; and
wherein a diameter of the distal planar surface of the nozzle is greater than the width of the cavity between the first wall and the second wall.

6. The method as in claim 1, wherein the width of the cavity between the first wall and the second wall varies.

7. The method as in claim 1, wherein the first wall and the second wall define multiple cavities.

8. The method as in claim 7, wherein the nozzle is indexed to inject material to two or more of the multiple cavities.

9. The method as in claim 7, wherein the multiple cavities are offset in multiple directions.

10. The method as in claim 1, wherein injecting the second material into the cavity between the first wall and the second wall includes: i) moving the nozzle with respect to a lengthwise axis of the cavity; and ii) dispensing the second material into the cavity as the nozzle is moved along the lengthwise axis.

11. The method as in claim 1, wherein dispensing the first material includes:
via first passes of dispensing the first material to fabricate the first wall and the second wall: i) dispensing a first path of the first material onto a first region of the substrate, the first path being disposed at a first layer of the first wall, and ii) dispensing a second path of the first material onto a second region of the substrate, the second path being disposed at a first layer of the second wall; and
via second passes of dispensing the first material to fabricate the first wall and the second wall: i) dispensing a third path of the first material onto the first layer of the first wall, the third path being disposed at a second layer of the first wall, and ii) dispensing a fourth path of the first material onto the first layer of the second wall, the fourth path being disposed at a second layer of the second wall.

12. The method as in claim 11, wherein dispensing the first material further includes:
via third passes of dispensing the first material to fabricate the first wall and the second wall: i) dispensing a fifth path of the first material onto the second layer of the first wall, the fifth path being disposed at a third layer of the first wall, and ii) dispensing a sixth path of the first material onto the second layer of the second wall, the sixth path being disposed at a third layer of the second wall.

13. The method as in claim 12, wherein the width of the first wall is defined by a single pass of dispensing the first material; and
wherein the width of the second wall is defined by a single pass of dispensing the first material.

14. The method as in claim 11, wherein the cavity is a first cavity;
wherein a space between a first surface of the first wall and a first surface of the second wall defines the first cavity;
wherein the first surface of the first wall is disposed on a first facing of the first wall; and
wherein a second surface of the first wall defines a second cavity, the second surface of the first wall disposed on a second facing of the first wall, the second facing disposed opposite the first facing.

15. The method as in claim 11, wherein the width of the first wall is created and defined by a single pass of a print head dispensing the first path of the first material onto the first region of the substrate; and
wherein the width of the second wall is created and defined by a single pass of the print head dispensing the second path of the first material onto the second region of the substrate.

16. The method as in claim 1, wherein the width of the first wall is defined by a first single pass of a printer head dispensing the first material; and
wherein the width of the second wall is defined by a second single pass of the printer head dispensing the first material.

17. The method as in claim 1, wherein the cavity is a first cavity, the method further comprising:
dispensing the first material to fabricate a third wall on the substrate, a space between the second wall and the third wall defining a second cavity, the third wall produced from multiple layers of the dispensed first material.

18. The method as in claim 17, wherein a width of the second cavity between the second wall and the third wall is greater than the width of the second wall and a width of the third wall.

19. The method as in claim 5, wherein a bore size of the nozzle dispensing the first material is less than the width of the cavity between the first wall and the second wall; and
wherein the distal surface is a planar distal surface, the planar distal surface being wider than the width of the cavity.

20. The method as in claim 1, wherein the distal surface is a planar distal surface of the nozzle;
wherein contacting the planar distal surface of the nozzle to the respective surfaces of the first wall and the second wall includes:
via the planar distal surface of the nozzle, compressing the first wall and the second wall, the compressing forming the seal between the planar distal surface of the nozzle and the respective surfaces of the first wall and the second wall.

21. The method as in claim 20, wherein compressing the first wall and the second wall temporarily reduces a height of the first wall and a height of the second wall with respect to a surface of the substrate to which the first wall and second wall are affixed.

22. The method as in claim 1, wherein injecting second material through the nozzle into the cavity between the first wall and the second wall causes temporary outward deflection of the first wall and the second wall with respect to the cavity.

23. The method as in claim 22, wherein a temperature of the second material injected into the cavity reduces over time, causing volumetric shrinkage of the injected second material in the cavity.

24. The method as in claim 23, wherein injecting the second material through the nozzle into the cavity includes:
controlling a pressure associated with dispensing the second material through the nozzle into the cavity during the dispensing to compensate for the volumetric shrinkage of the second material injected into the cavity.

25. The method as in claim 1, wherein the second material is injected through the nozzle into the cavity at a volumetric rate of greater than 12.5 cubic millimeters per second.

26. The method as in claim 1, wherein the width of the first wall is defined by a single pass of a print head dispensing the first material onto a first region of the substrate; and
wherein the width of the second wall is defined by a single pass of the print head dispensing the first material onto a second region of the substrate.

27. The method as in claim 11, wherein the width of the first wall is created and defined by a single pass of a print head dispensing the first path of the first material onto the first region of the substrate; and
wherein the width of the second wall is created and defined by a single pass of the print head dispensing the second path of the first material onto the second region of the substrate.

28. The method as in claim 1, wherein a thermal mass of the injected second material in the cavity is operative to provide heat to: i) a first interface between the injected second material in the cavity and the first wall, and ii) a second interface between the injected second material in cavity and the second wall.

29. The method as in claim 28, wherein the multiple planar layers include: i) first planar layers of the first material in the first wall, and ii) second planar layers of the first material in the second wall;
wherein the first interface is a first interlocking interface formed via variations in print widths within each layer of the first planar layers of the first material in the first wall; and
wherein the second interface is a second interlocking interface formed via variations in print widths within each layer of second planar layers of the first material in the second wall.

30. The method as in claim 1, wherein the multiple planar layers include: i) first planar layers of the first material in the first wall, and ii) second planar layers of the first material in the second wall;
wherein the first wall includes a first interlocking interface with the second material injected into the cavity, the first interlocking interface formed via variations in widths of the dispensed first material within each printed layer of the first planar layers in the first wall; and
wherein the second wall includes a second interlocking interface with the second material injected into the cavity, the second interlocking interface formed via variations in widths of the dispensed first material within each printed layer of the second planar layers in the second wall.

31. A 3-D printed component comprising:
a first material dispensed onto a substrate, the dispensed first material producing a first wall and a second wall that define a cavity, each of the first wall and the second wall produced from multiple layers of the first dispensed material;
a second material injected into the cavity between the first wall and the second wall, the second material injected into the cavity being interlocked with the first wall and the second wall based on variations in widths of the cavity between the first wall and the second wall;
wherein the widths of the cavity between the first wall and the second wall are greater than a width of the first wall and a width of the second wall; and
wherein regions of bulk printed material fabricated from the second material in the 3-D component are volumetrically larger than regions of layer-wise printed material fabricated from the first material in the 3-D component.

32. The 3-D printed component as in claim 31, wherein the first material is the same as the second material.

33. The 3-D printed component as in claim 31, wherein the second material is different than the first material.

34. The 3-D printed component as in claim 31, wherein the first wall and the second wall define multiple cavities.

35. The 3-D printed component as in claim 31, wherein the second material is injected through a bore of a nozzle into the cavity between the first wall and the second wall via: i) movement of the nozzle with respect to a lengthwise axis of the cavity; and ii) dispensing of the second material into the cavity as the nozzle is moved along the lengthwise axis.

36. The 3-D printed component as in claim 31, wherein the dispensed first material in the first wall occupies a first volume;
wherein the injected second material in the cavity occupies a second volume; and
wherein the second volume is greater in magnitude than the first volume.

37. The 3-D printed component as in claim 36, wherein the dispensed first material in the second wall occupies a third volume; and
wherein the second volume is greater in magnitude than the third volume.

* * * * *